United States Patent [19]
Fujimoto

[11] Patent Number: 4,862,379
[45] Date of Patent: Aug. 29, 1989

[54] NUMERICAL CONTROL MACHINE

[75] Inventor: Akihiko Fujimoto, Nagoya, Japan

[73] Assignee: Mitsubishi Denki Kabushiki Kaisha, Tokyo, Japan

[21] Appl. No.: 69,336

[22] Filed: Jul. 2, 1987

[30] Foreign Application Priority Data

| Jul. 4, 1986 | [JP] | Japan | 61-156298 |
| Aug. 6, 1986 | [JP] | Japan | 61-183470 |
| Aug. 20, 1986 | [JP] | Japan | 61-192977 |
| Aug. 22, 1986 | [JP] | Japan | 61-195640 |
| Aug. 22, 1986 | [JP] | Japan | 61-195639 |
| Aug. 26, 1986 | [JP] | Japan | 61-198250 |
| Aug. 26, 1986 | [JP] | Japan | 61-198251 |
| Aug. 26, 1986 | [JP] | Japan | 61-198252 |
| Aug. 26, 1986 | [JP] | Japan | 61-198253 |
| Aug. 26, 1986 | [JP] | Japan | 61-198249 |
| Aug. 26, 1986 | [JP] | Japan | 61-198248 |

[51] Int. Cl.⁴ .................................................. G05B 19/18
[52] U.S. Cl. ................................................. 364/474.11
[58] Field of Search ............... 364/167, 171, 474, 475, 364/474.11

[56] References Cited

U.S. PATENT DOCUMENTS

| 3,573,738 | 4/1971 | Bottles et al. | 364/169 X |
| 3,626,385 | 12/1971 | Bouman | 364/474 |
| 4,092,720 | 5/1978 | Carey | 364/474 |
| 4,348,623 | 9/1982 | Kobayashi et al. | 364/474 X |
| 4,700,313 | 10/1987 | Takagawa | 364/474 |

FOREIGN PATENT DOCUMENTS

| 0056062 | 7/1982 | European Pat. Off. . |
| 0103714 | 3/1984 | European Pat. Off. . |
| 57-169812 | 4/1981 | Japan . |

Primary Examiner—Allen MacDonald
Attorney, Agent, or Firm—Armstrong, Nikaido, Marmelstein, Kubovcik & Murray

[57] ABSTRACT

This invention is a numerical control machine having information input/output units for working data and for control data, a single control unit including a CPU, arithmetic unit, and a plurality of memory areas which may include program areas and data areas, and a driving unit including a plurality of independently operable drive system, which may be divided by system control means into a plurality of arbitrary groups corresponding to a plurality of independently executable control programs so that each group may be independently controlled by a separate program, wherein the entire numerical control apparatus acts as a plurality of control processing systems so that each operable system may be independently controlled by an independent program or a group of systems may be controlled by the same program.

14 Claims, 33 Drawing Sheets

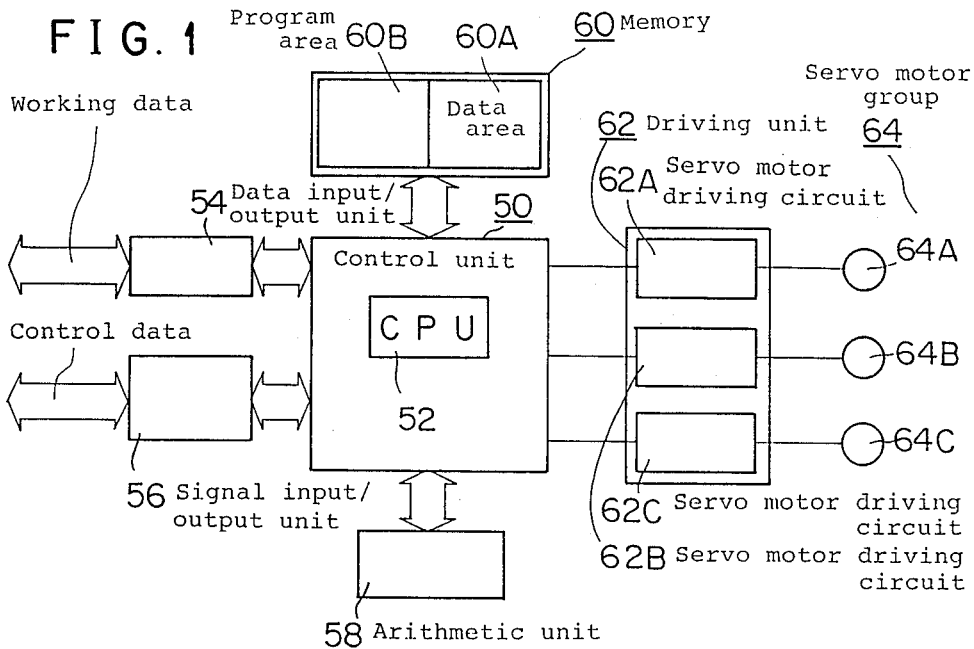

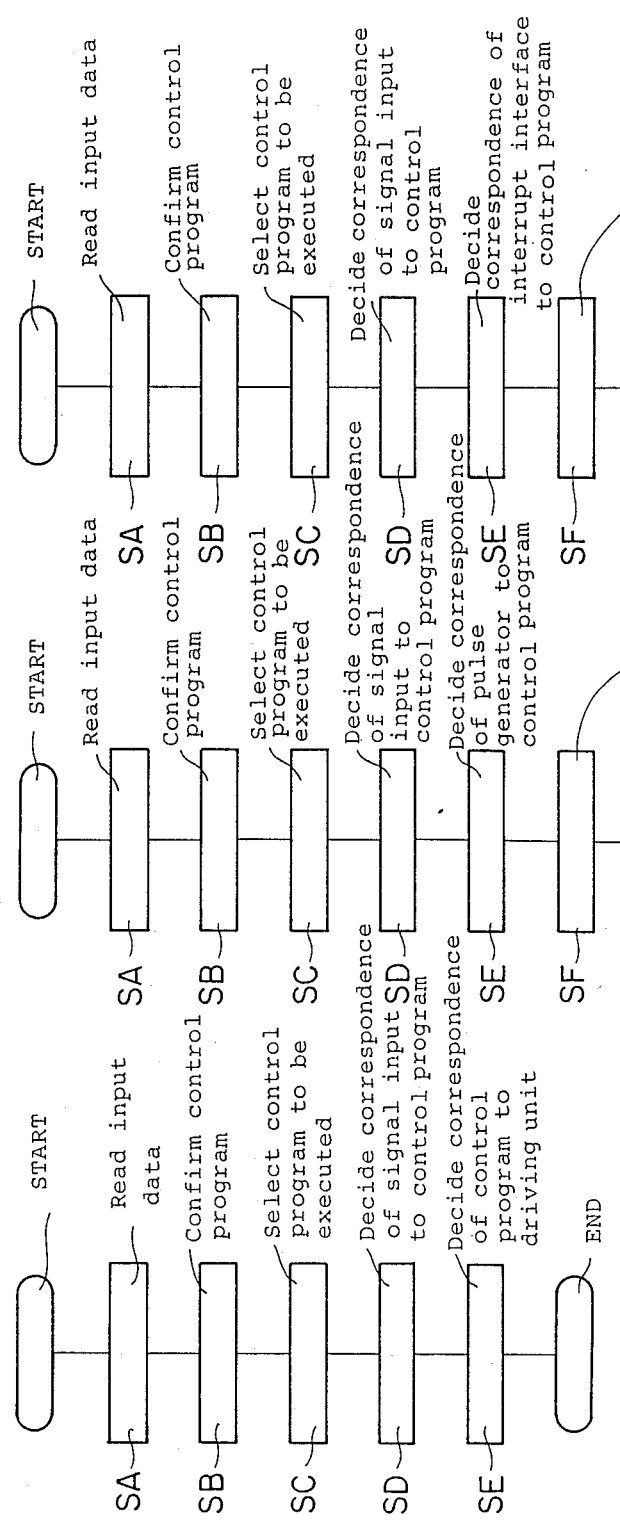

FIG. 4
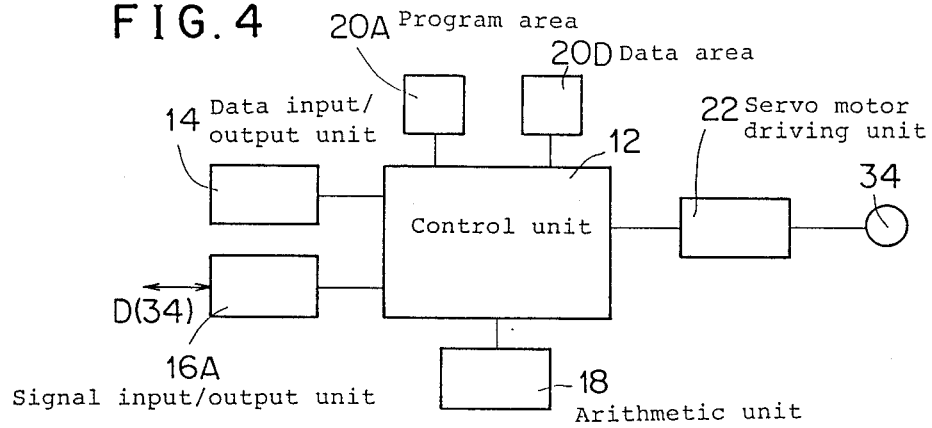
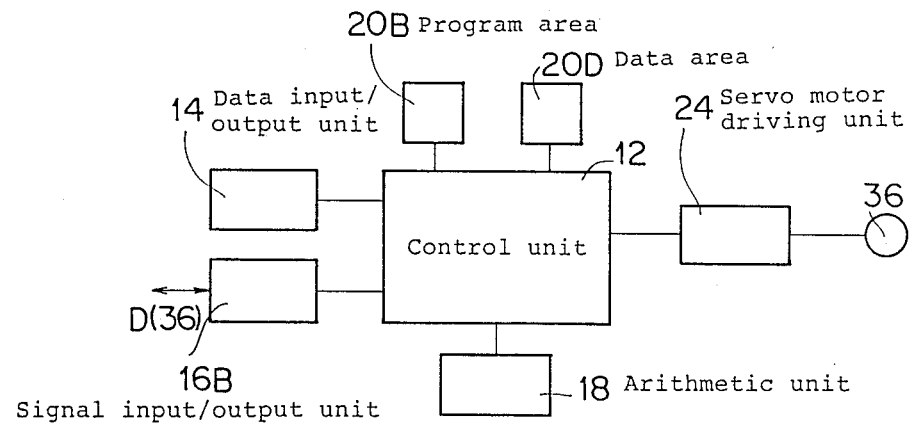
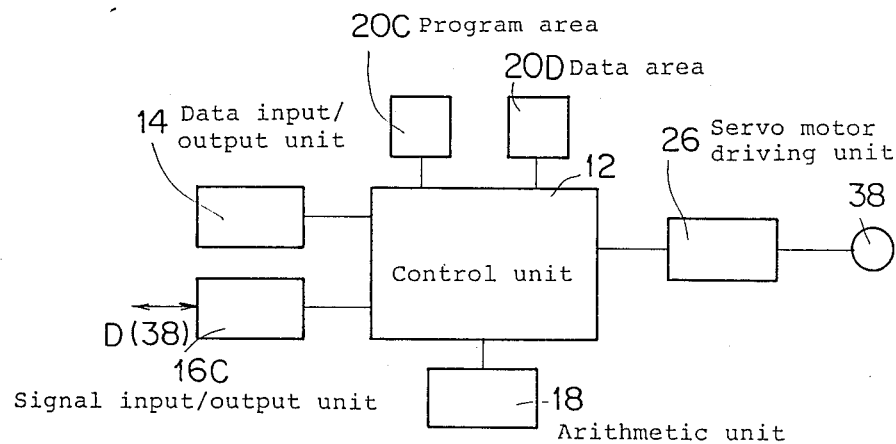

FIG. 5
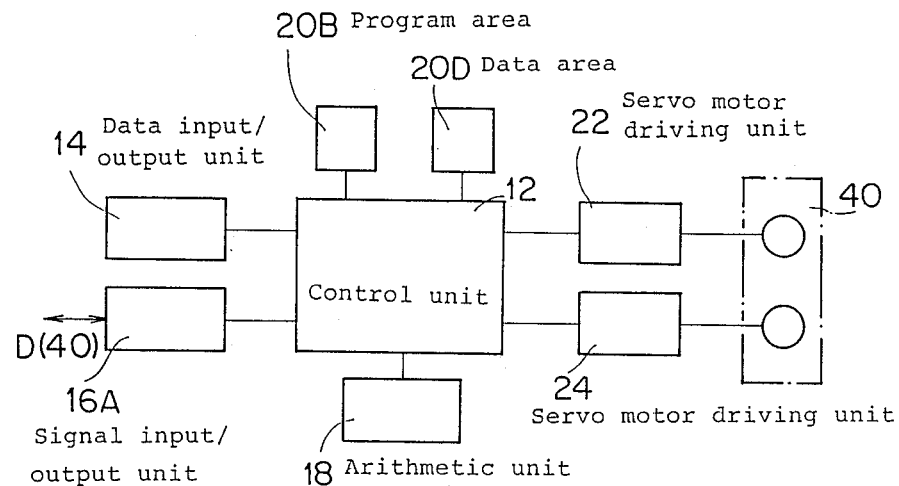
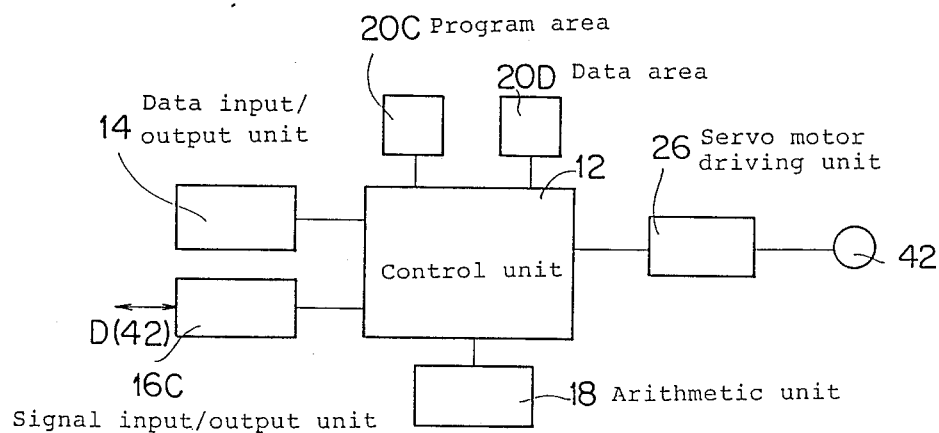

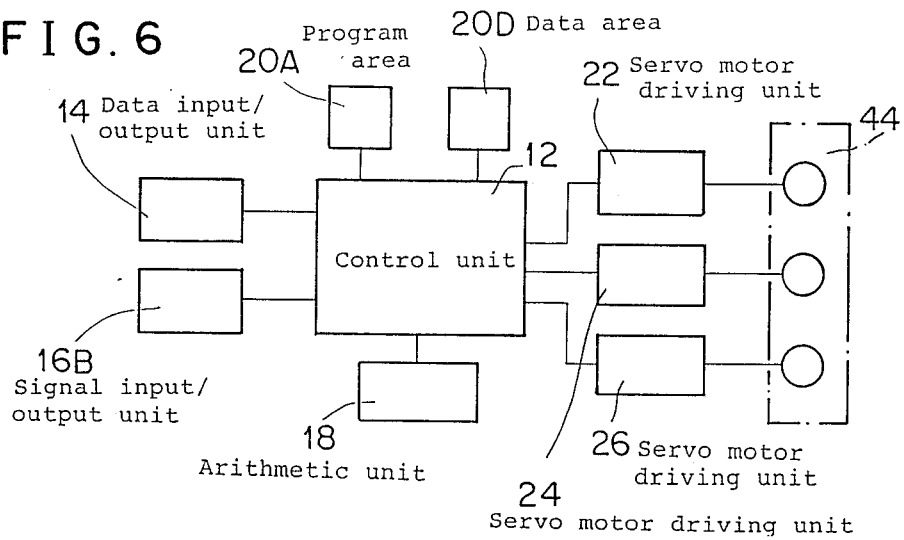
FIG. 6
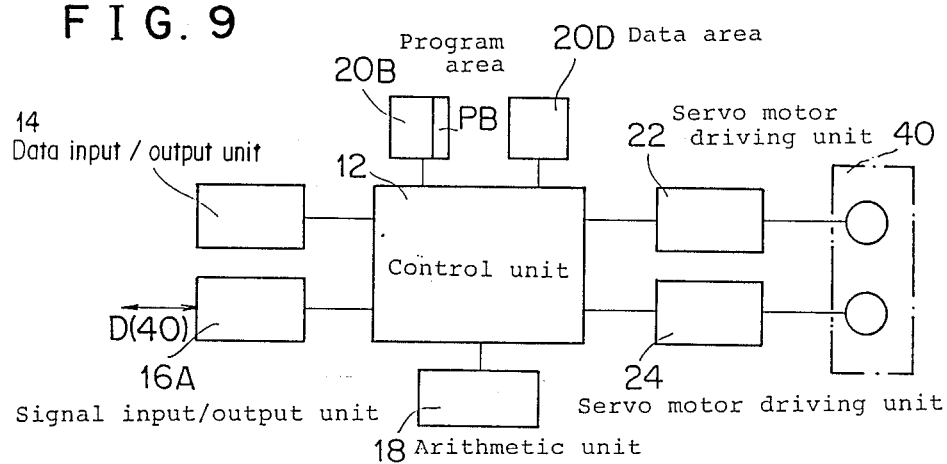
FIG. 9
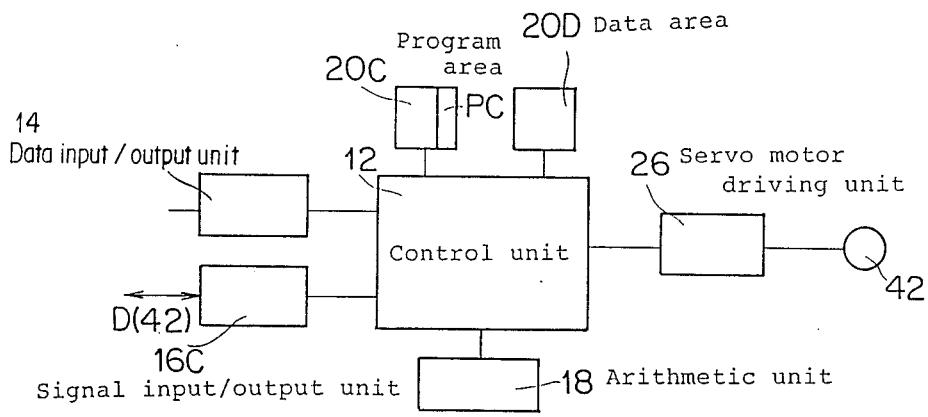

FIG. 8
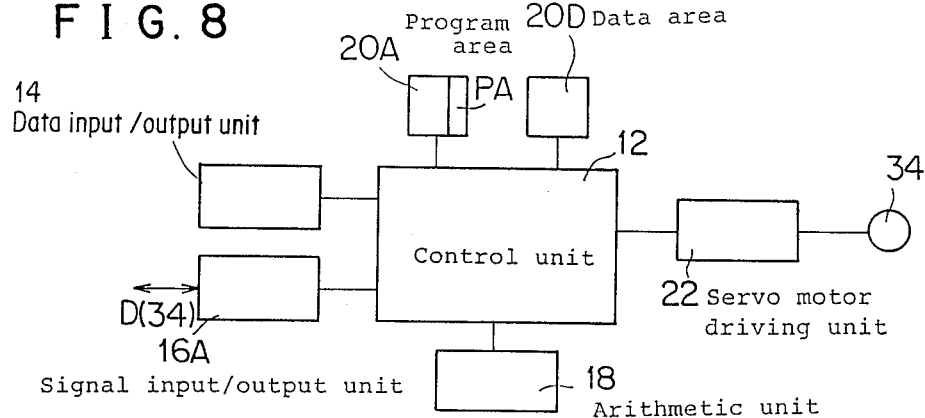
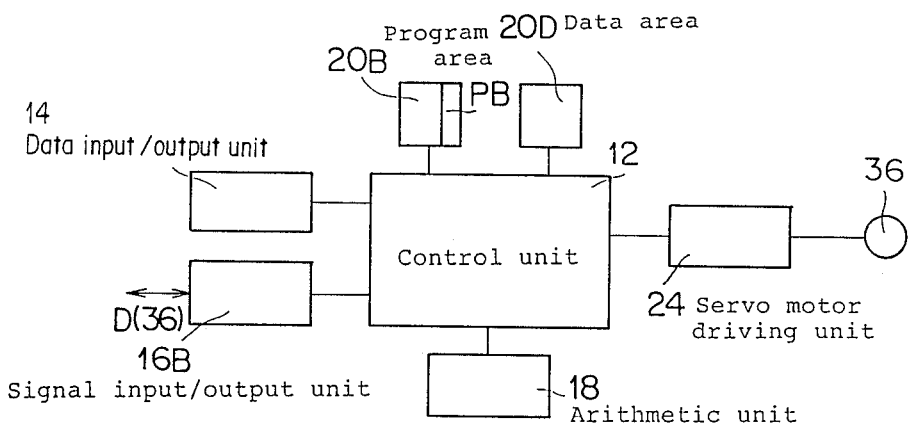
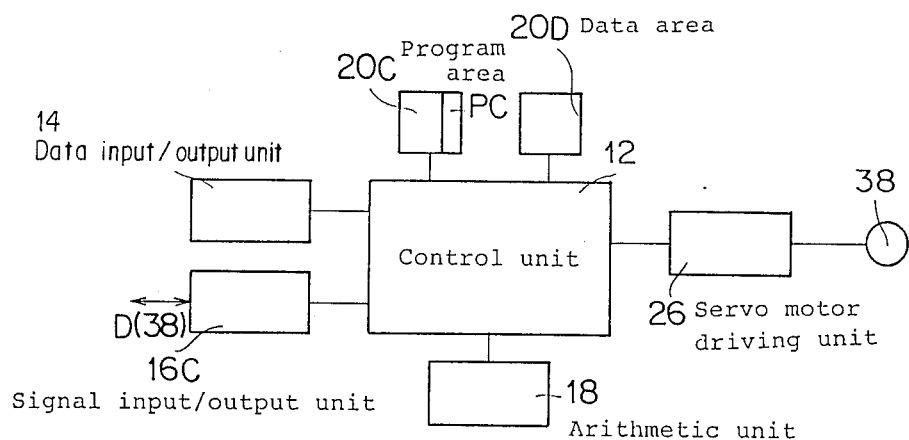

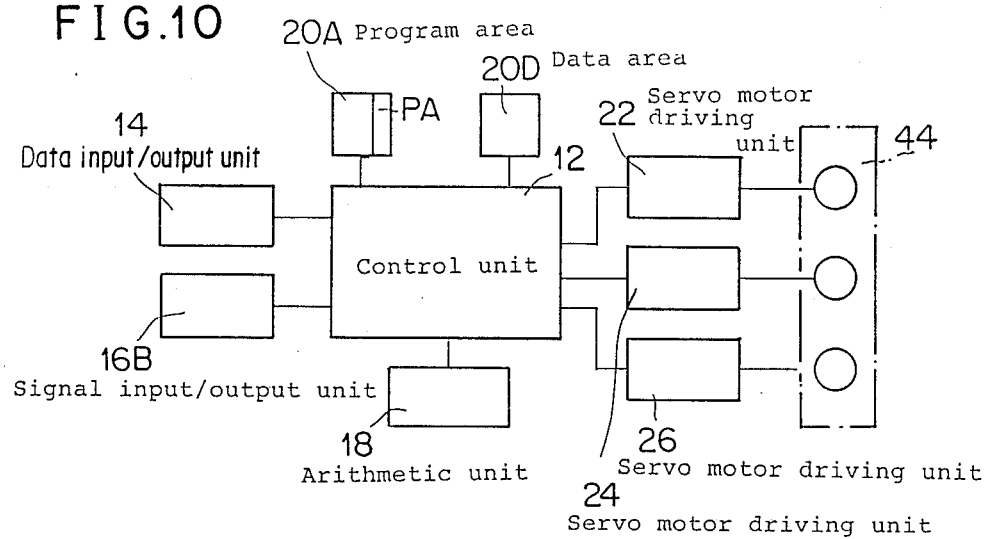
FIG.10
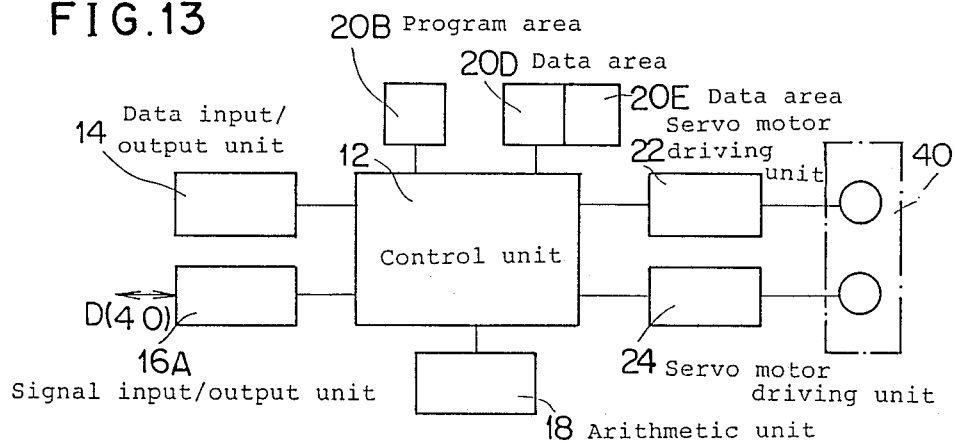
FIG.13
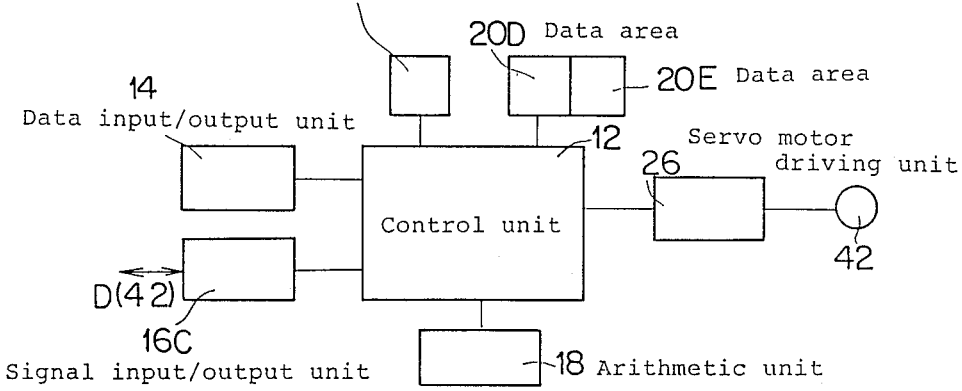

FIG. 12
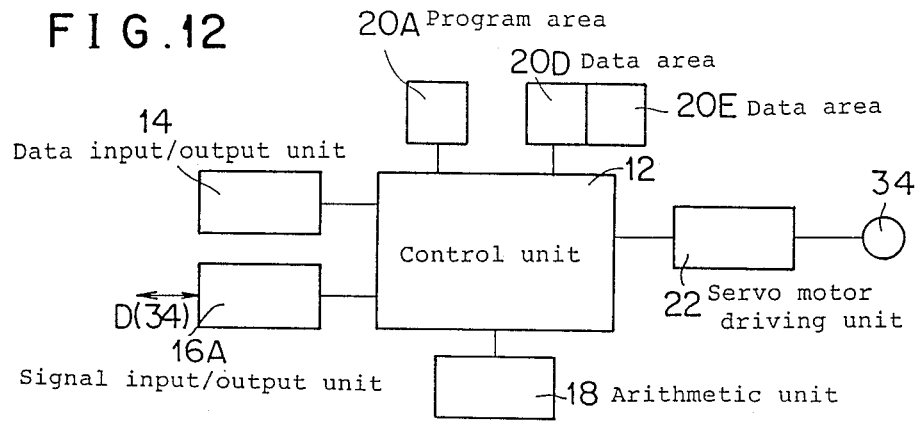
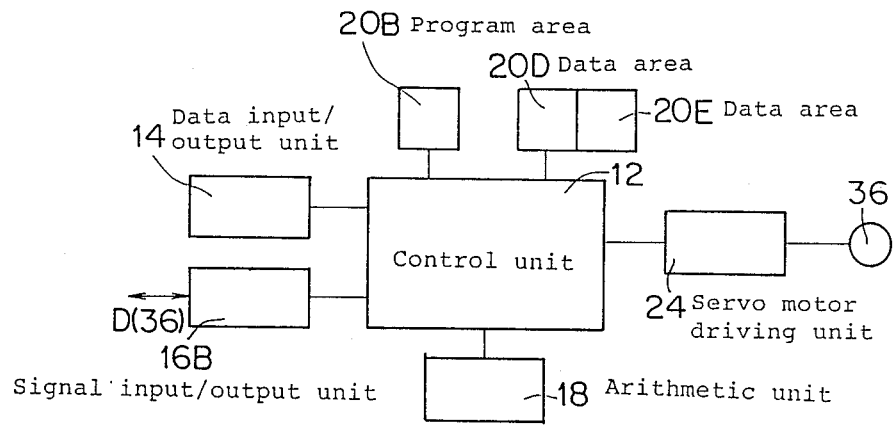
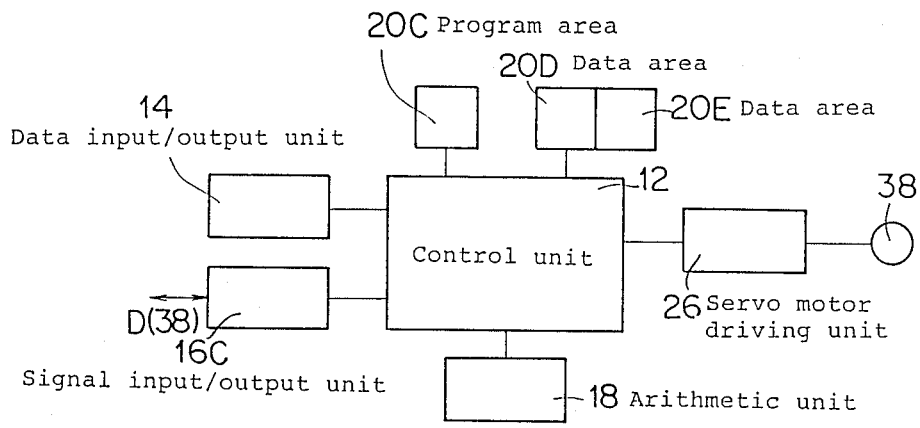

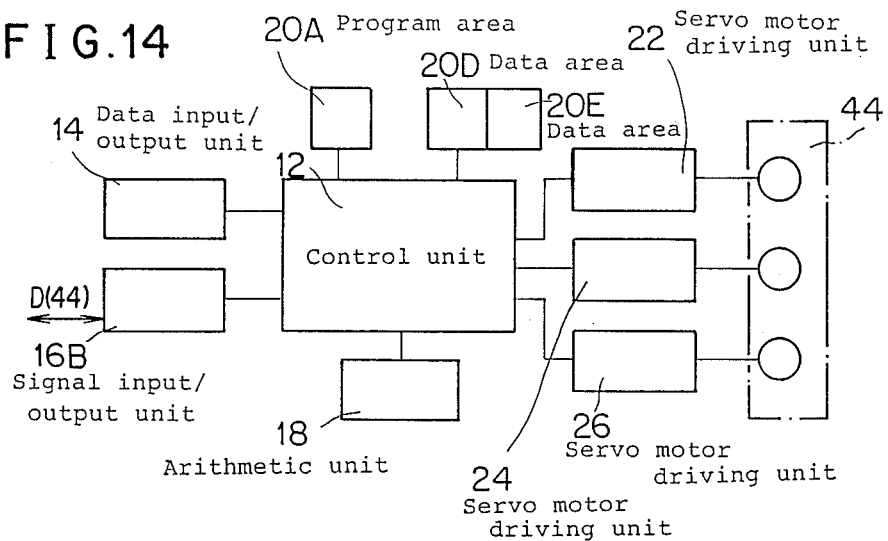
FIG.14
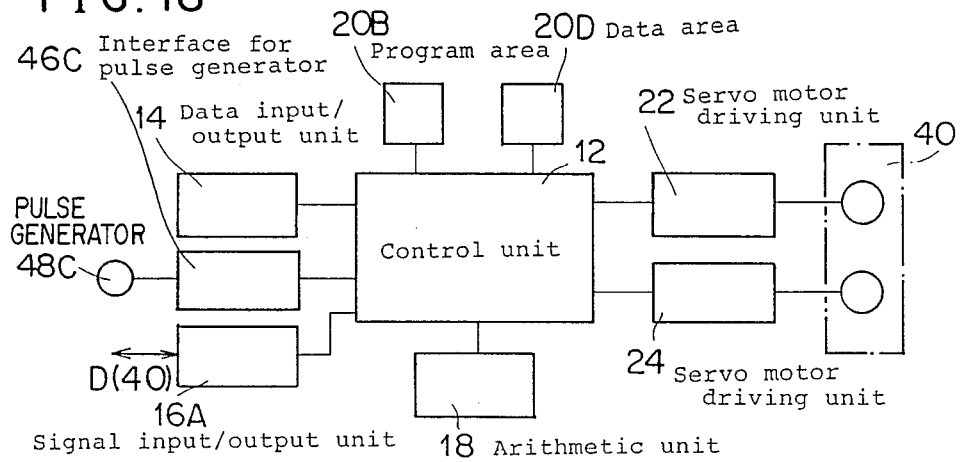
FIG.18
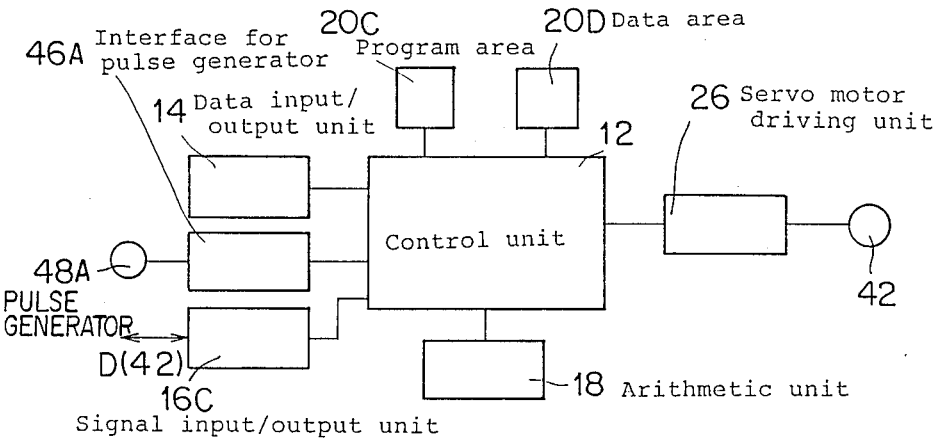

FIG. 22
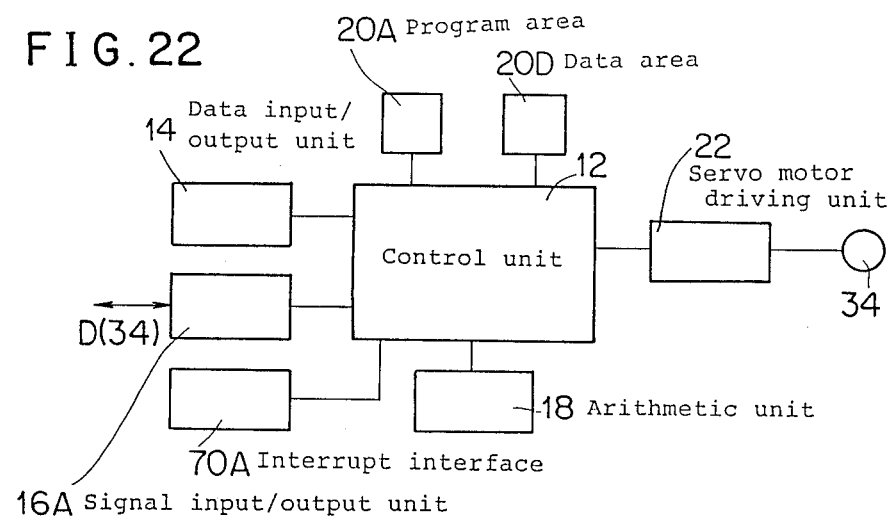
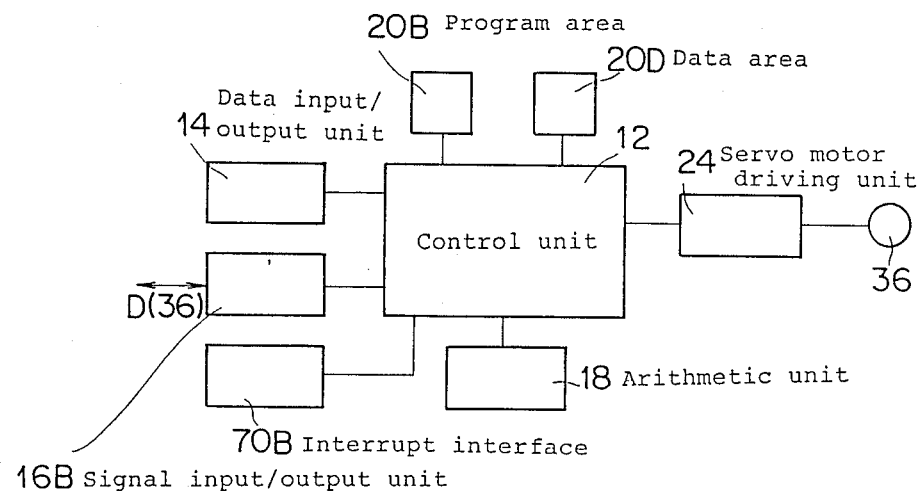
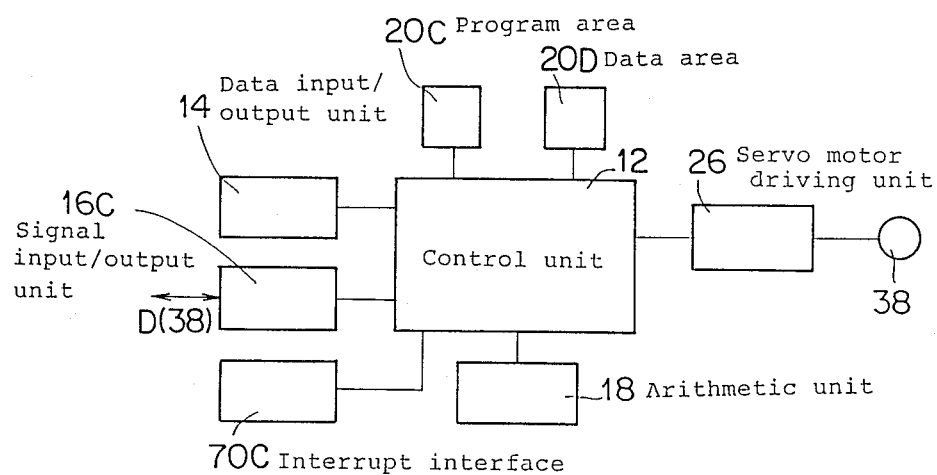

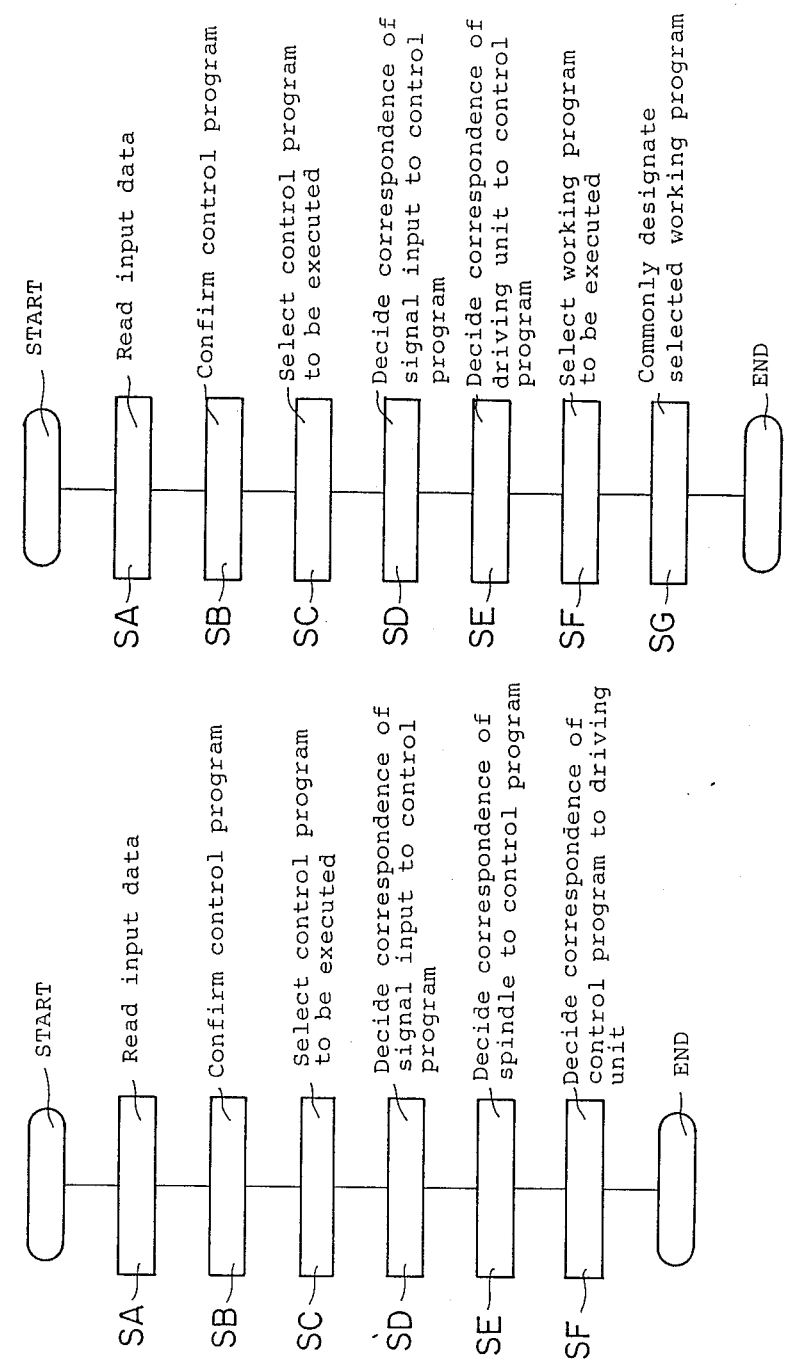
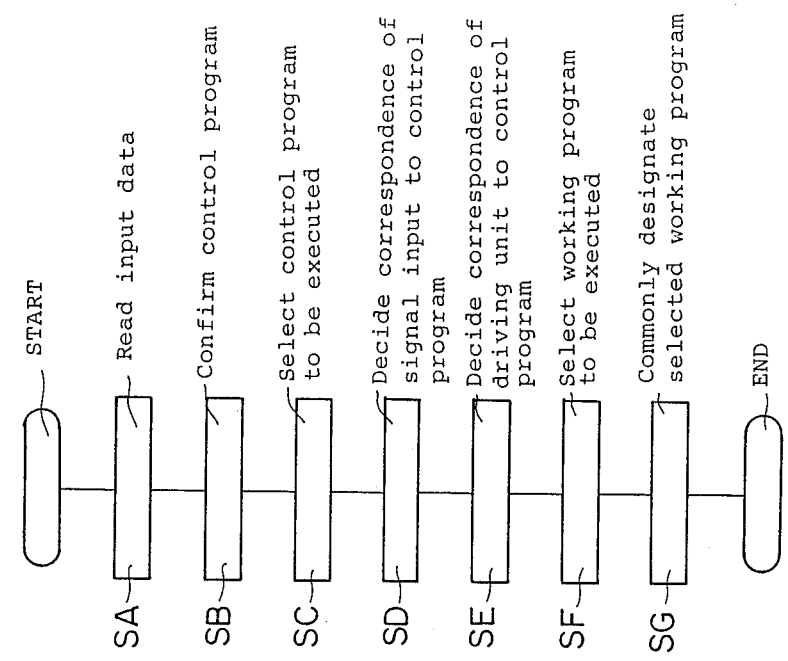

FIG. 27
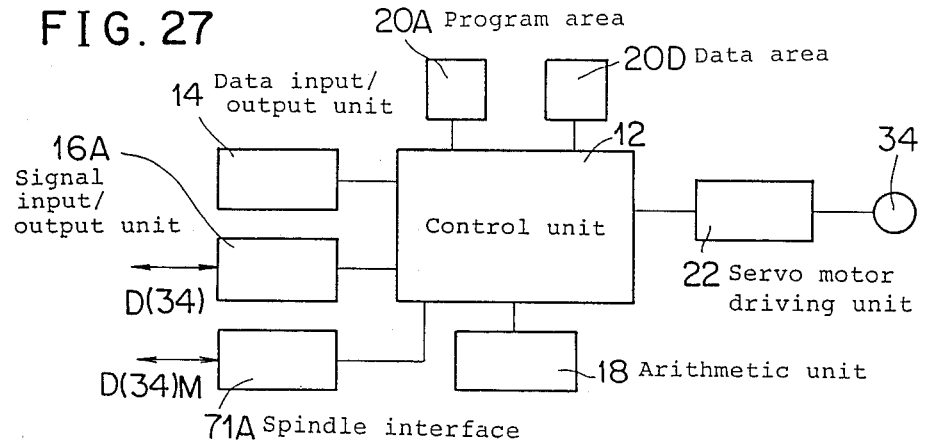
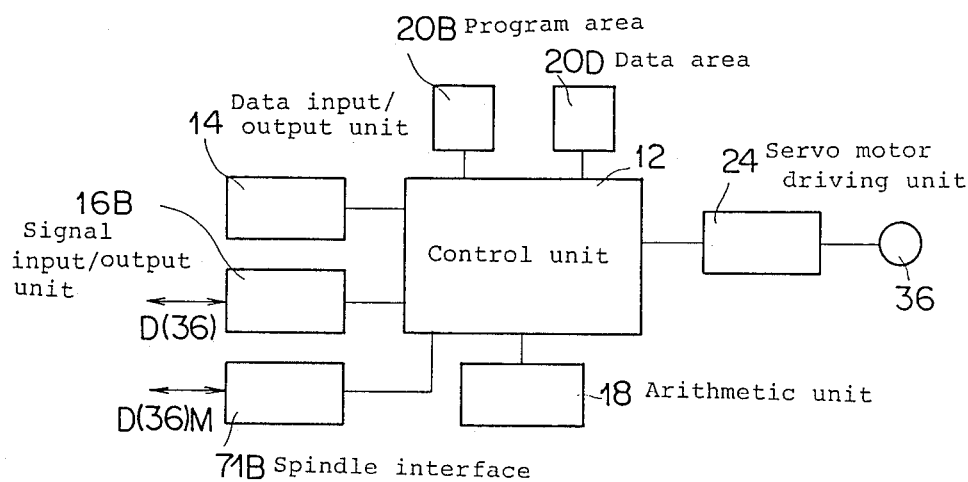
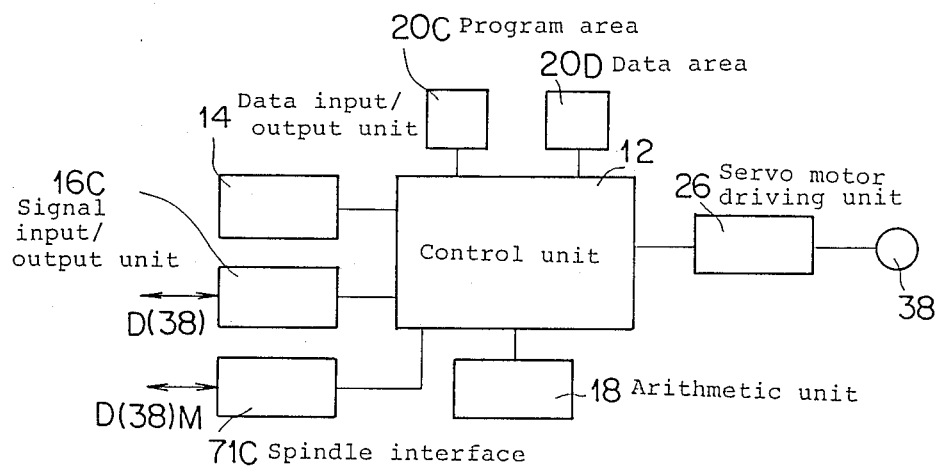

FIG. 28
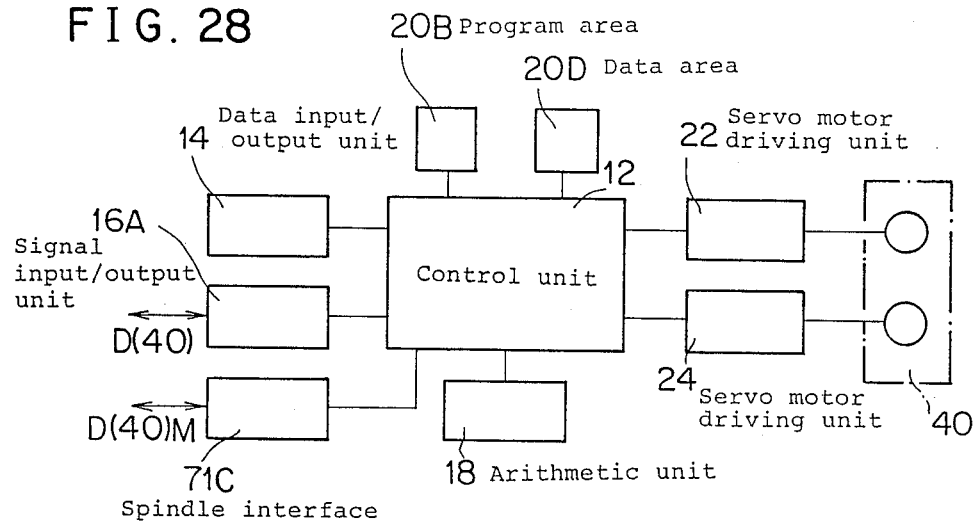
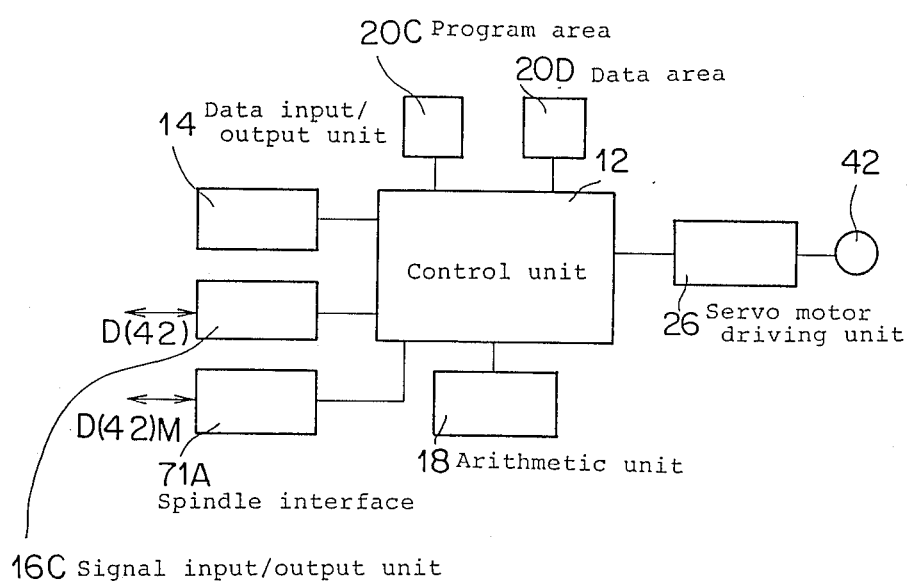

FIG. 33A
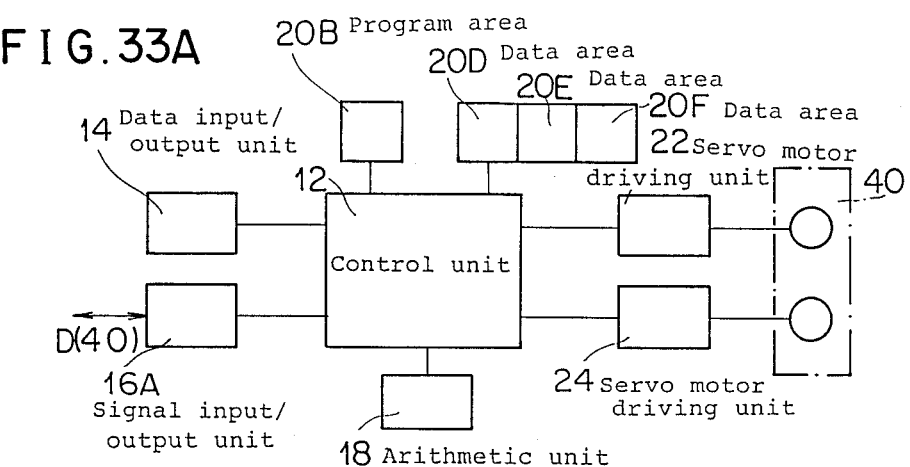
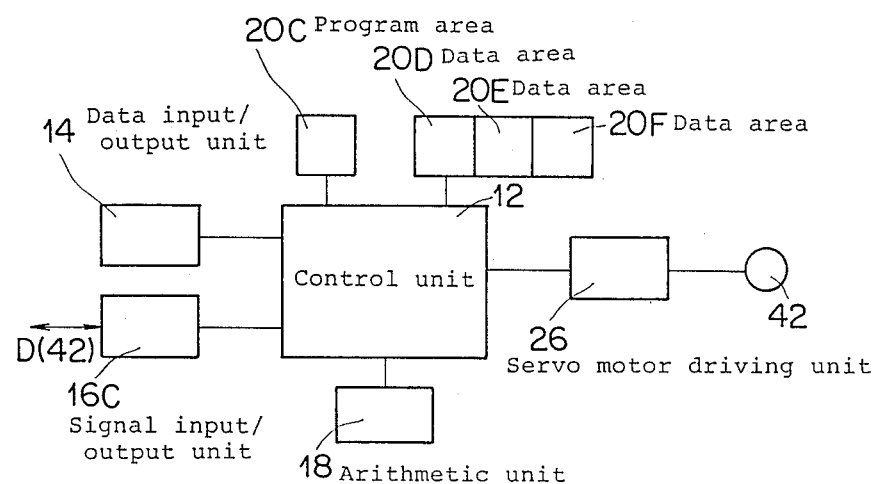
FIG. 33B
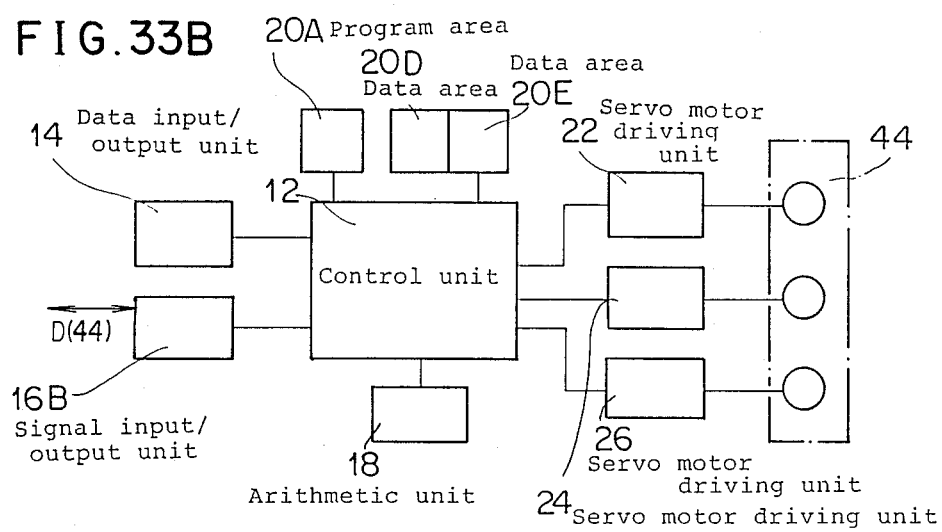

FIG. 36
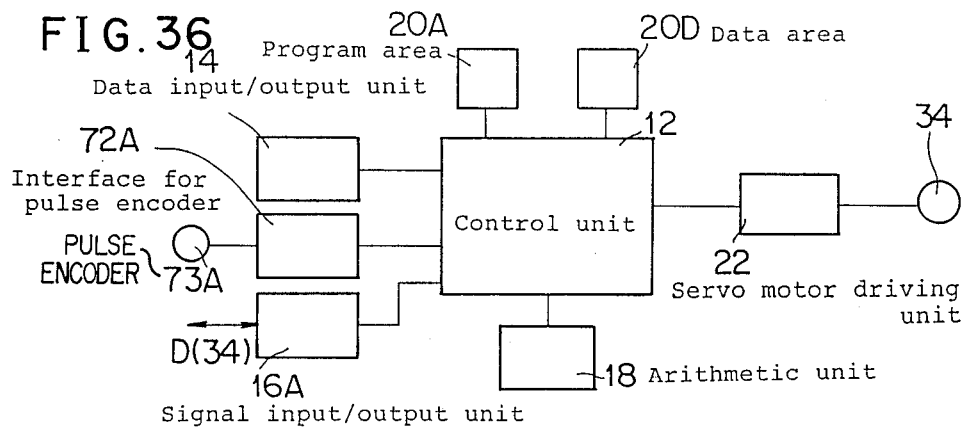
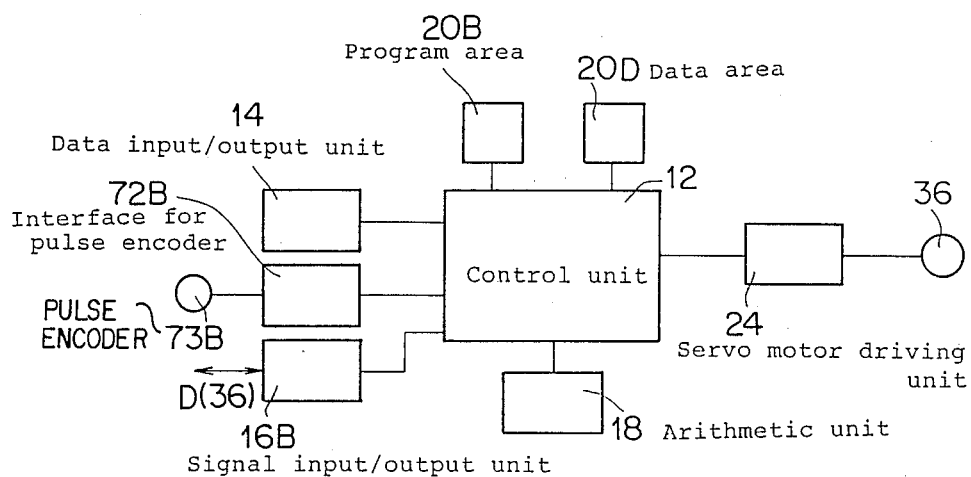
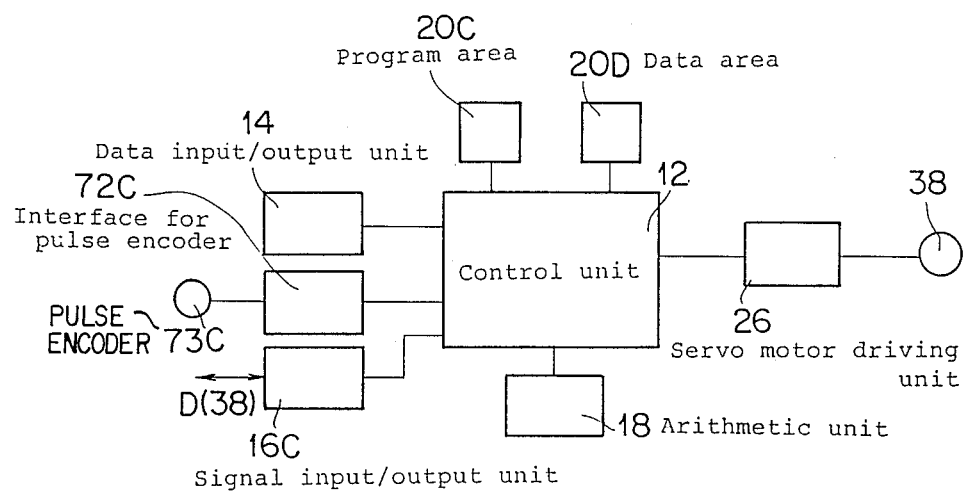

FIG. 40
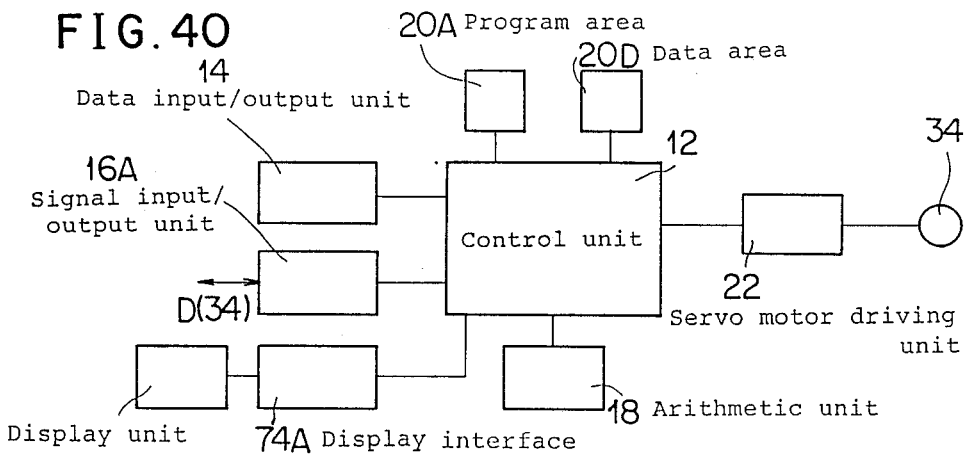
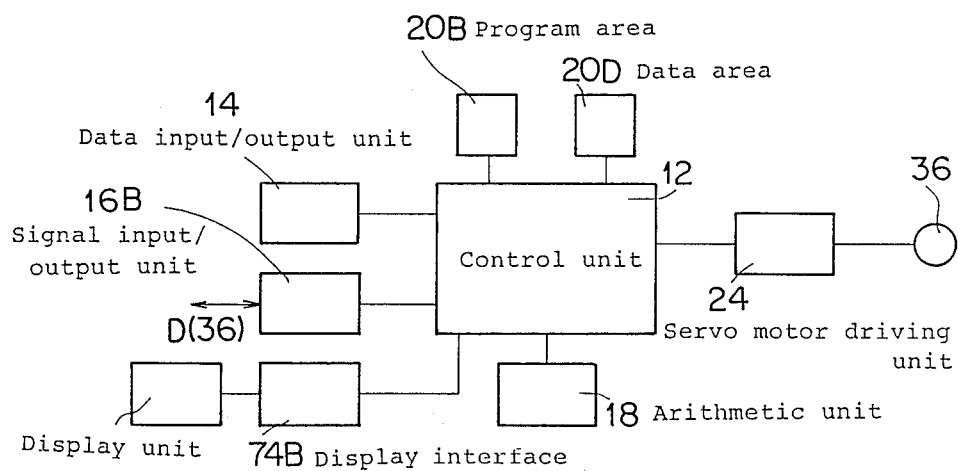
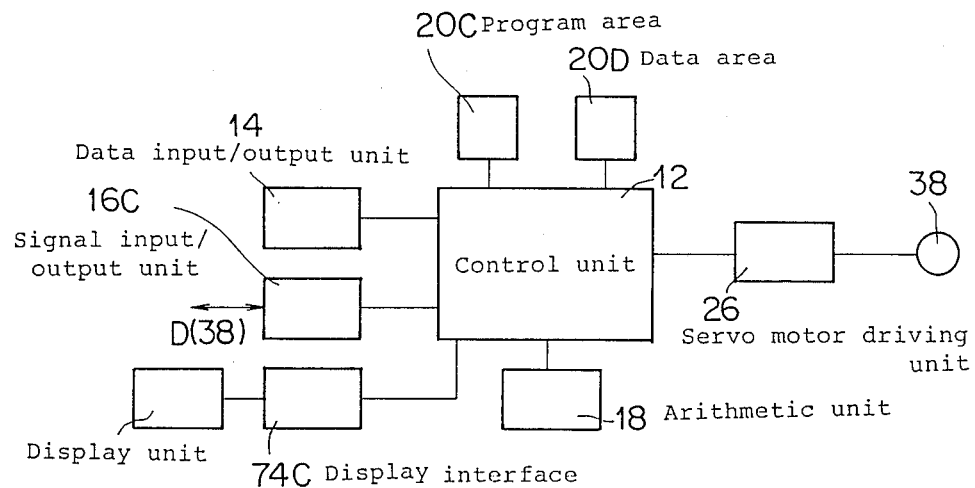

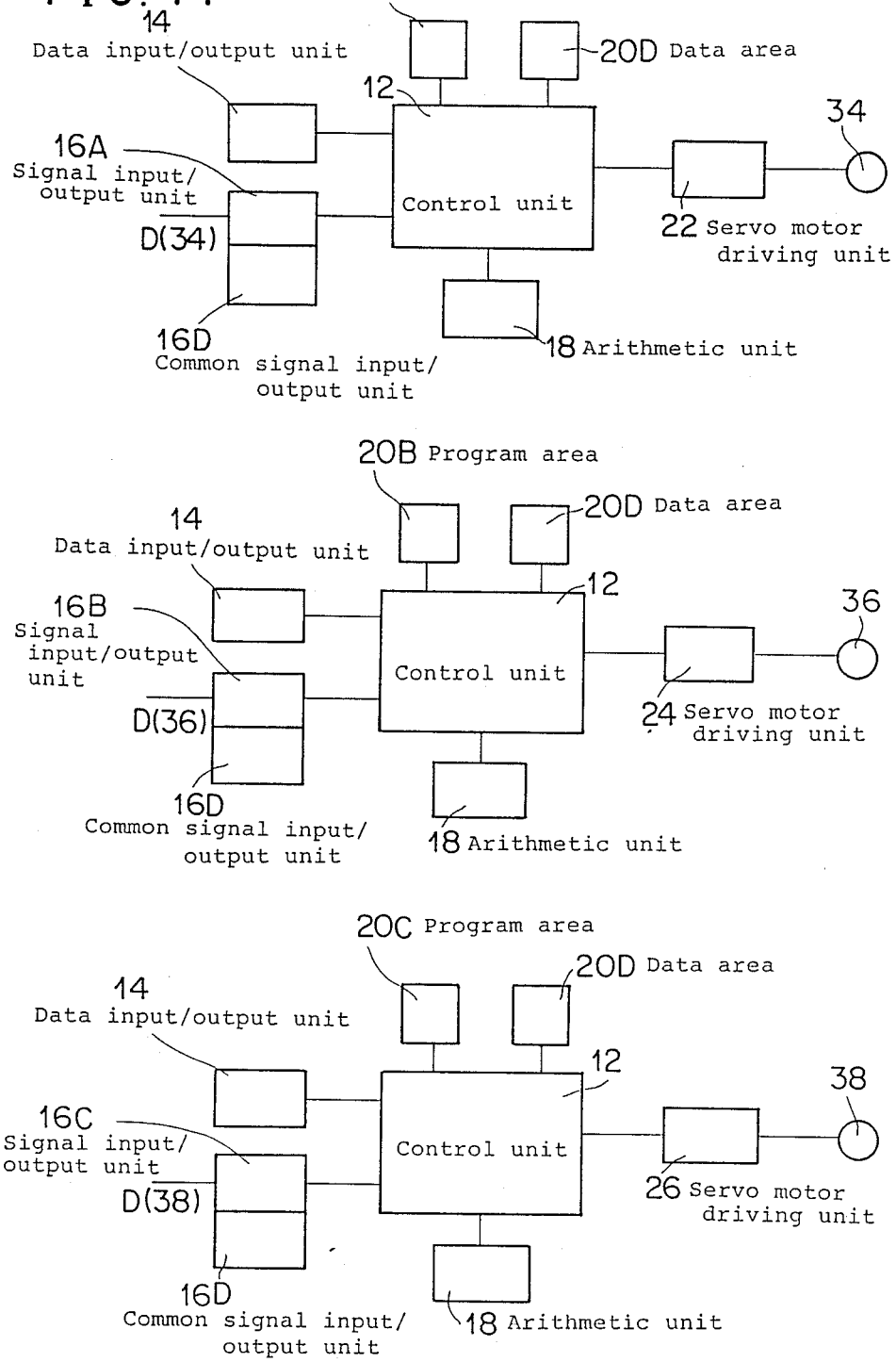

FIG. 45
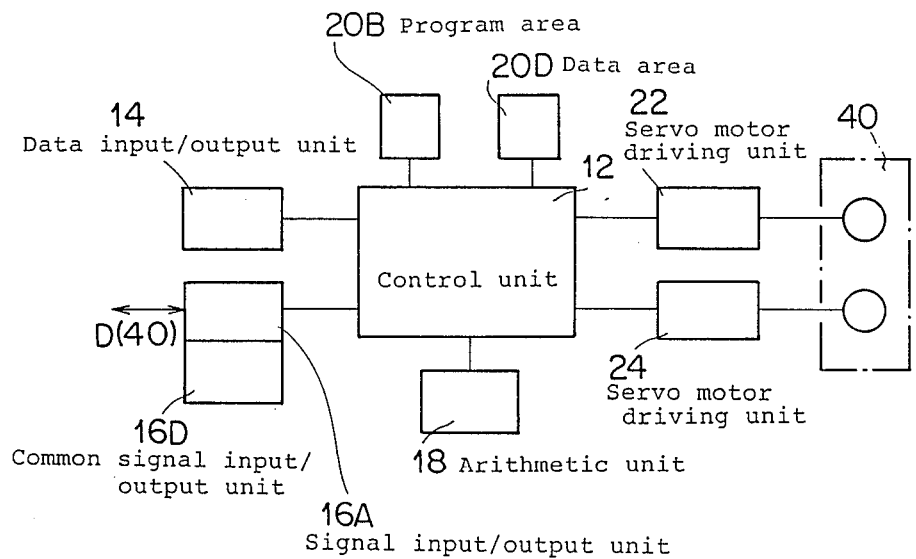
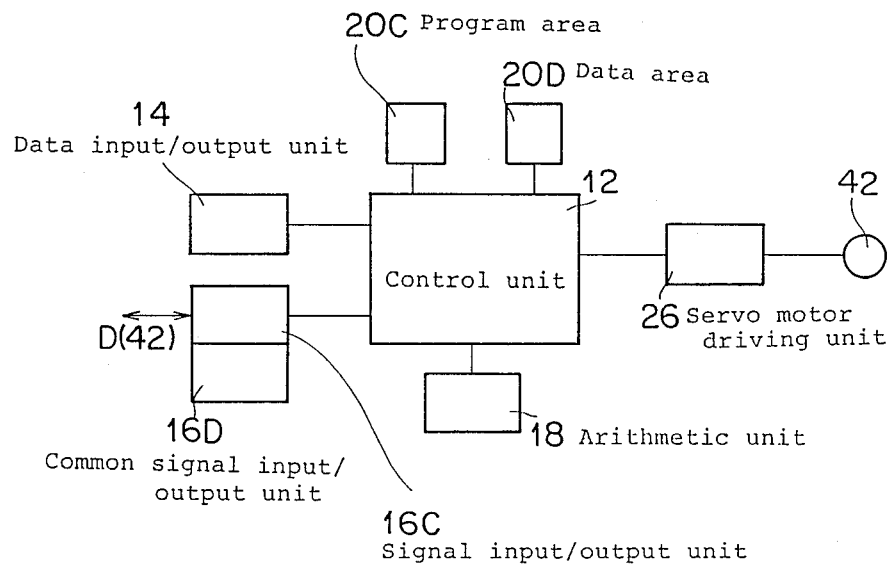

NUMERICAL CONTROL MACHINE

BACKGROUND OF THE INVENTION

Since a numerical control for instructing the position of a tool to a workpiece by numeric information has advantages of improvement in its productivity, energy-saving, and ease of supervision, numerical control is applied to various machine tools and is widely utilized.

FIG. 1 shows an example of a prior art numerical control. In FIG. a control unit 50 has a central processing unit (hereinafter referred to as "CPU") 52, and a data input/output unit 54 and a signal input/output unit 56 are connected to the control unit 50.

An arithmetic unit 58, a memory 60 and a driving unit 62 are connected to the control unit 50, and a servo motor group 64 is connected to the driving unit 62.

The data input/output unit 54 is for inputting working data from an external data input/output unit, not shown, and for outputting the data to the control unit 50, and the signal input/output unit 56 is for inputting control data such as start, stop, and for outputting the data to the control unit 50.

The memory 60 has a data area 60A and a program area 60B. The working data input from the data input/output unit 54 is stored in the data area 60A, and the control data input from the signal input/output unit 56 is stored in the program area 60B.

The arithmetic unit 58 then performs necessary calculation to control a servo motor group 64, and calculates, for example, to interpolate to obtain a moving distance for a predetermined time by resolving the speed in each axial direction of orthographic coordinates when a driving command is given in terms of a vector speed.

The driving unit 62 has three driving circuits 62A, 62B and 62C corresponding to three servo motors 64A, 64B and 64C of the servo motor group 64.

The servo motor group 64 actually corresponds to the servo motors of each of three shaft driving sections of a machine tool such as a lathe or a milling machine.

Data necessary to control the operation of a machine tool are inputted through the data input/output unit 54 and the signal input/output unit 56 from an external computer. These data are respectively stored by the control unit 50 in the data area 60A and the program area 60B of the memory 60.

The control unit 50 calculates the above-mentioned interpolation by the arithmetic unit 58 from the data stored in the data memory area 60A according to the program and the data stored in the program memory area 60B, and provides instructions necessary to drive the driving unit 62. Thus, the servo motor group 64 is driven to execute a predetermined machining operation according to the input data.

As described above, the servo motors 64A, 64B and 64C of the servo motor group 64 are not independently driven, but are only driven integrally.

The above-described conventional numerical control only operates by the control program stored in the program area 60B of the memory 60, and the servo motors 64A, 64B and 64C connected to the driving unit 62, and cannot independently drive the servo motors 64A, 64B and 64C connected to the driving unit 62.

For example, the numerical control cannot operated both to rotate the tool of a milling machine by the servo motor 64A and to use a lathe by the servo motors 64B and 64C.

Thus, it is necessary to install separate numerical controls as shown in FIG. I for the respective machines. Therefore, when controlling the numeric values of a number of machines, a large installation is required that results in an undesirable increase in the cost.

This invention has been made to eliminate the above disadvantages, and an object thereof to provide a numerical control machine capable of efficiently numerically controlling a plurality of machines at less cost.

SUMMARY OF THE INVENTION

This invention relates to a numerical control machine and, more particularly, to a numerical control machine for controlling a plurality of shafts to be controlled.

This invention is a numerical control machine having information input/output units for working data and for control data, a single control unit including a CPU, arithmetic unit, and a plurality of memory areas which may include program areas and data areas, and a driving unit including a plurality of independently operable drive systems, which may be divided by system control means into a plurality of arbitrary groups corresponding to a plurality of independently executable control programs so that each group may be independently controlled by a separate program, wherein the entire numerical control apparatus acts as a plurality of control processing systems so that each operable system may be independently controlled by an independent program or a group of systems may be controlled by the same program.

The numerical control machine may include various specialized program memory areas and data memory areas which are addressed by control means to perform specific functions, and means for performing those functions. These means may be such as sequence control means for executing independent sequence control programs stored in respective program areas; name setting means for arbitrarily assigning names to objects to be controlled by a program; interfaces for pulse generators to measure shaft rotation speeds; interrupt signal interfaces for interrupting execution of an operation; shaft or spindle interfaces to input and output independent spindle control data; additional data memory areas for storing working programs with predetermined work numbers; pulse encoder means and interfaces therefor to measure shaft position display units and interfaces therefor; and a common signal input/output unit for information common to all systems.

BRIEF DESCRIPTION OF THE DRAWINGS

FIG. 1 is a block diagram showing a prior art numerical control;

FIG. 2 is a block diagram showing a first embodiment of this invention;

FIG. 3 is an explanatory view for describing the function of system control means according to the first embodiment of this invention;

FIGS. 4 to 6 are explanatory views showing the operating modes of the first embodiment shown in FIG. 2;

FIGS. 8 to 10 are explanatory views showing the operating modes of the second embodiment shown in FIG. 7;

FIGS. 12 to 14 are explanatory views showing the operating modes of the third embodiment shown in FIG. 11;

FIG. 16 is an explanatory view for describing the function of system control means according to the fourth embodiment;

FIGS. 17 to 19 are explanatory views showing the operating modes of the fourth embodiment shown in FIG. 15;

FIG. 21 is an explanatory view for describing the function of system control means according to the fifth embodiment;

FIGS. 22 to 24 are explanatory views showing the operating modes of the fifth embodiment shown in FIG. 20;

FIG. 26 is an explanatory view for describing the function of system control means according to the sixth embodiment;

FIGS. 27 to 29 are explanatory views showing the operating modes of the sixth embodiment shown in FIG. 25;

FIG. 31 is an explanatory view for describing the function of system control means according to the seventh embodiment;

FIGS. 32, 33A, 33B are explanatory views showing the operating modes of the seventh embodiment shown in FIG. 30;

FIGS. 36, 37A, 37 are explanatory views showing the operating modes of the eighth embodiment shown in FIG. 34;

FIG. 39 is an explanatory view for describing the function of system control means according to the ninth embodiment;

FIGS. 40 to 42 are explanatory views showing the operating modes of the ninth embodiment shown in FIG. 38;

FIGS. 44 to 46 are explanatory views showing the operating modes of the tenth embodiment shown in FIG. 43.

DETAILED DESCRIPTION OF THE INVENTION

Figure 7:
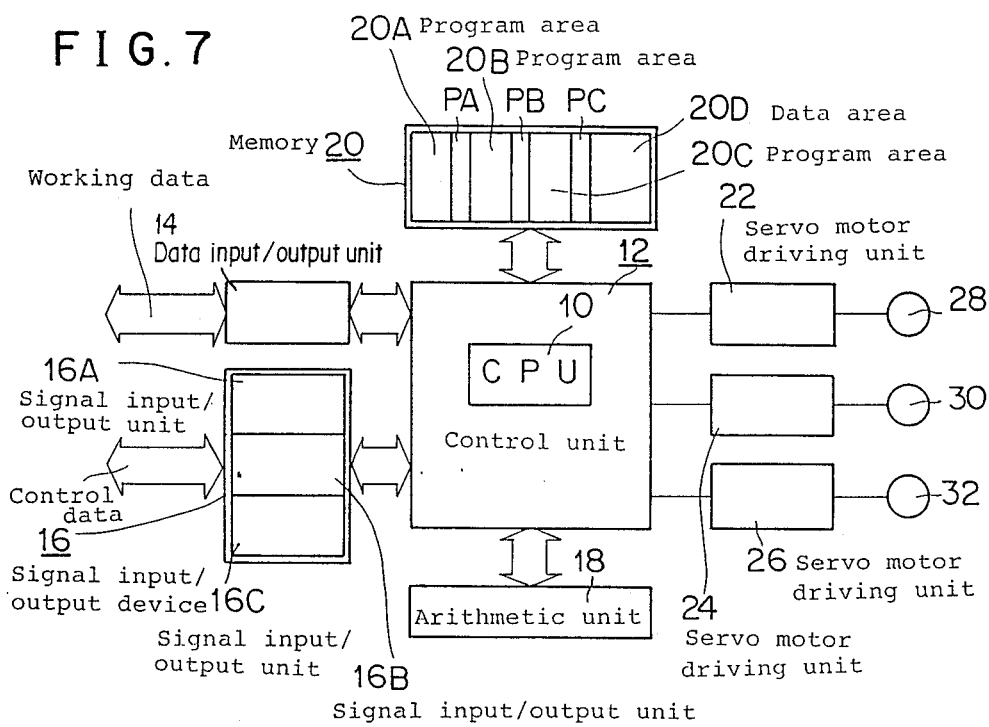
FIG. 7 is a block diagram showing a numerical control according to a second embodiment of this invention.

Embodiments of this invention will be described in detail with reference to the accompanying drawings.

(Embodiment 1)

FIG. 2 shows a first embodiment of a numerical control according to this invention. In FIG. 2, a data input/output unit 14 is connected to a control unit 12 having a CPU 10. The data input unit 14 corresponds to the data input/unit 54 in FIG. 1, and inputs working data from an external data input/output unit (not shown), and outputs the working data to the control unit 12.

Next, a signal input/output device 16 is connected to the control unit 12. The signal input/output device 16 has signal input/output units 16A, 16B and 16C Which can independently input controlling data and can independently output the controlling data to the control unit 12. In other words, the signal input/output units 16A, 16B and 16C respectively have functions similar to those of the signal input/output unit 56 in FIG. 1.

An arithmetic unit 18 is connected to the control unit 12. The arithmetic unit 18 computes the above-mentioned interpolation or the like calculation.

A memory 20 is connected to the control unit 12. The memory 20 has independently operable program areas 20A, 20B and 20C, wherein independently operable control programs are stored. In other words, the programs stored in the program areas 20A, 20B and 20C have functions similar to the program stored in the program area 60B in FIG. 1, and can be independently executed.

Further, the memory 20 has a data area 20D. The data area 20D stores working data as the data area 60A does in FIG. 1, and additionally stores programmed system control means.

Servo motor driving units 22, 24 and 26 are respectively connected to the control unit 12. The driving units 22, 24 and 26 can independently operate and have similar functions to those of driving unit 62 in FIG. 1. However, each driving unit can control only one shaft.

Servo motors 28, 30 and 32 are respectively connected to the driving units 22, 24 and 26. The servo motors 28 30 and 32 are not always limited to the same machine, but may be applicable to two or more machines and be independently operable.

System control means stored in the above-mentioned data are 20D will be described next. This means is executed in the control unit 12.

As shown in FIG. 3, the data input from the data input/output unit 14 and the signal input/output device 16 are referred to the control programs stored in the program areas 20A to 20C to decide which of these control programs to operate (in steps SA, SB and SC). Then, it is decided if the program to be operated corresponds to the signal input/output units 16A to 16C for inputting the control data to be used therefor (in step SD). Further, the correspondence of the program to the driving units 22 to 26 to be operated is decided (in step SE).

As described above, the system control means performs the functions of systemizing the signal input/output units 16A to 16C, the program areas 20A to 20C, and driving units 22 to 26 according to the content of the control operation required, and grouping the same.

Then, the entire operation of the embodiment 1 will be described in various cases by way of examples.

Referring to FIG. 4, the case that machines 34, 36 and 38, respectively, each having one shaft, are independently controlled will be first described. The signal input/output unit 16A inputs and outputs the control data D34 of the machine 34, the signal input/output unit 16B inputs and outputs the control data D36 of the machine 36, and the signal input/output unit 16C inputs and outputs the control data D38 of the machine 38. The control programs of the machines 34 to 38 are stored in the program areas 20A to 20C, respectively.

In this case, the system control means of the above-mentioned data area 20D systemizes the signal input- /output unit 16A, the program area 20A and the driving unit 22, systemizes the signal input/output unit 16B, the program area 20B and the driving unit 24, and also systemizes the signal input/output unit 16C, the program area 20C and the driving unit 26.

The servo motors 28 to 32 are independently controlled according to the control data inputted from the signal input/output units 16A to 16C, and the control programs stored in the program areas 20A to 20C, respectively. In other words, the machines 34 to 38 are independently operated to be started and stopped. The control unit 12 executes a so-called "task control" at this time.

As described above, in this example, the entire numerical control apparatus operates as three independent numerical controls.

Then, referring to FIG. 5, the case that the machine 40 has two servo motors and the machine 42 has one servo motor which are independently controlled will be described.

In FIG. 5, the signal input/output unit 16A inputs and outputs the control data D40 for the machine 40, the signal input/output unit 16C inputs and outputs the control data D42 for the machine 42 and the control program for operating the machine 40 is stored in the program area 20B and the control program for operating the machine 42 is stored in the program area 20C.

In this case, as shown in FIG. 5, the system control means of the data area 20D systemizes the signal input/output unit 16A, the program area 20B and the driving units 22 and 24, and also systemizes the signal input/output unit 16C, the program area 20C and the driving unit 26

The machine 40 is controlled by the control program stored in the program area 20C and the machine 42 is controlled by the control program stored in the program area 20C. Since two servo motors are to be controlled to control the machine 40, the arithmetic unit 18 calculates any necessary interpolation.

As described above, in this example, the entire numerical control apparatus operates as the numerical controls of two independent systems.

Referring to FIG. 6, the other operating mode of this embodiment will be described.

In FIG. 6, the example of the case that the machine 44 has three servo motors is shown. In this case, the signal input/output unit 16B which inputs and outputs the control data D44, the program area 20A so storing the control program and the driving units 22 to 26 are systemized. In this example, a single system equivalent to the numerical control in FIG. 1 is controlled.

This invention is not limited to the particular embodiment described above. For example, in the embodiment described above, the numerical control can construct three independent systems at the maximum, and may have double systems or more.

According to the first embodiment of this invention as described above, various independent control systems can be constructed by the system control means. Therefore, the numerical control of this embodiment has such advantages that a plurality of machines can be efficiently numerically controlled and their costs can be reduced.

(Embodiment 2)

Next, a second embodiment of this invention in which the entire numerical control apparatus constructs a plurality of control processing systems, and each system is independently controlled by independent control program and sequence control means will be described in detail with reference to the accompanying drawings.

FIG. 7 shows embodiment 2 of a numerical control apparatus according to this invention. In FIG. 7, the same reference numerals are those in FIG. 2 designate the same or equivalent parts. In FIG. 7, a data input/output unit 14 is connected to a control unit 12 having a CPU 10. The data input unit 14 corresponds to the data input/unit 54 in FIG. 1, and inputs working date from an external data input/output unit (not shown), and outputs the working data to the control unit 10.

A signal input/output device 16 is connected to the control unit 12. The signal input/output device 16 has signal input/output units 16A, 16B and 16C which can independently input controlling data and ca independently output the controlling data to the control unit 12. In other words, the signal input/output units 16A, 16B and 16C, respectively, have similar functions to those of the signal input/output unit 56 in FIG. 1.

An arithmetic unit 18 is connected to the control unit 12. The arithmetic unit computes the above-mentioned interpolation or the like calculation.

A memory 20 is connected to the control unit 12. The memory 20 has program areas 20A, 20B and 20C. The program areas 20A, 20B and 20C respectively store independently operable control programs. In other words, the programs stored in the program areas 20A, 20B and 20C have functions similar to the program stored in the program area 60B in FIG. 1, and can be independently executed.

Program areas PA, PB and PC are respectively provided in the above-described program areas 20A, 20B and 20C of the memory 20. The program areas PA, PB and PC respectively store independently executable sequence control PLC. In other Words, the PLC stored in the program areas PA, PB and PC auxiliarily relate to the control of the numerical controls, and have, for example, functions for selecting tools to be independently operated.

Further, the memory 20 has a data area 20D. The data area 20D stores working data similarly to the data area 60A in FIG. 1, and additionally stores programmed system control means.

Then, as described with respect to the first embodiment of FIG. 2, driving units 22, 24 and 26 are respectively connected to the control unit 12 and servo motors 28, 30 and 32 are respectively connected to the driving units 22, 24 and 26.

System control means stored in the above-mentioned data area 20D will be described. This means is executed in the control unit 12.

As shown in FIG. 3 similarly to the embodiment 1 described above, the data inputted from the data input/output unit 14 and the signal input/output device 16 are referred to the control programs stored in the program areas 20A to 20C to decide to operate any of these control programs (in steps SA, SB and SC). Then, the correspondence of the program to be operated to the signal input/output units 16A to 16C for inputting the control data to be used therefor is decided (in step SD). Further, the correspondence of the program to the driving units 22 to 26 to be operated is decided (in step SE).

As described above, the system control means has functions for systemizing the signal input/output units 16A to 16C, the program areas 20A to 20C and PA to PC, and driving units 22 to 26 according to the content of the control operation to be required and grouping the same.

Then, the entire operation of the embodiment 2 will be described in various cases as examples. These examples are similar to the examples of embodiment 1 described above.

Referring to FIG. 8, the case that machines 34, 36 and 38, respectively, each having one shaft, are independently controlled similar to FIG. 4 will be first described.

In this case, however, the system control means of the above-mentioned data area 20D systemizes the signal input/output unit 16A the program ar 20A and PA and the driving unit 22, systemizes the signal input/output unit 16B the program 20B and PB and the driving unit 24, and also systemizes the signal input/output unit 16C, the program areas 20C and PC and the driving unit 26.

The servo motors 28 to 32 are independently controlled according to the control data inputted from the signal input/output units 16A to 16C the control programs stored in the program areas 20A to 20C, and the PLC stores in the program areas PA to PC, respectively. In other words, the machines 34 to 38 are independently operated to be started and stopped. The control unit 12 executes a so-called "task control" at this time.

As described above, in this example, the entire numerical control apparatus operates as three independent numerical controls.

Referring to FIG. 9, the case that the machine 40 having two servo motors and the machine 42 having one servo motor are independently controlled will be described.

In FIG. 9, similar to FIG. 5, the signal input/output unit 16A inputs and outputs the control data D40 for the machine 40, the signal input/output unit 16C inputs and outputs the control data D42 for the machine 42 and the control program for operating the machine 40 is stored in the program area 20B and the control program for operating the machine 42 is stored in the program area 20C.

Assume that the program area PB stores the PLC for the machine 40, and the program area PC stores the PLC for the machine 42.

In this case, as shown in FIG. 9, the system control means of the data area 20D systemizes the signal input/output unit 16A, the program areas 20B and PB and the driving units 22 and 24, and also systemizes the signal input/output unit 16C, the program areas 20C and PC and the driving unit 26.

The machine 40 is controlled by the control program stored in the program area 20B, the PLC stored in the program area PB, and the machine 42 is controlled by the control program stored in the program area 20C, the PLC stored in the program PC. Since two servo motors are to be controlled to control the machine 40, the arithmetic unit 18 calculates the interpolation.

As described above, in this example, the entire numerical control apparatus operates as the numerical controls of two independent systems.

Referring to FIG. 10 the other operating mode of this embodiment similar to FIG. 6 will be described.

In this case, the signal input/output unit 16B which inputs and outputs the control data D44, the program area 20A for storing the control program, the program area PA for storing the PLC, and the driving units 22 to 26 are systemized. In this example, one system equivalent to the numerical control in FIG. 1 is controlled.

(Embodiment 3)

A third embodiment of this invention is one in which the entire numerical control apparatus constructs a plurality of control processing systems, and each system is independently controlled by an independent control program.

Figure 11:
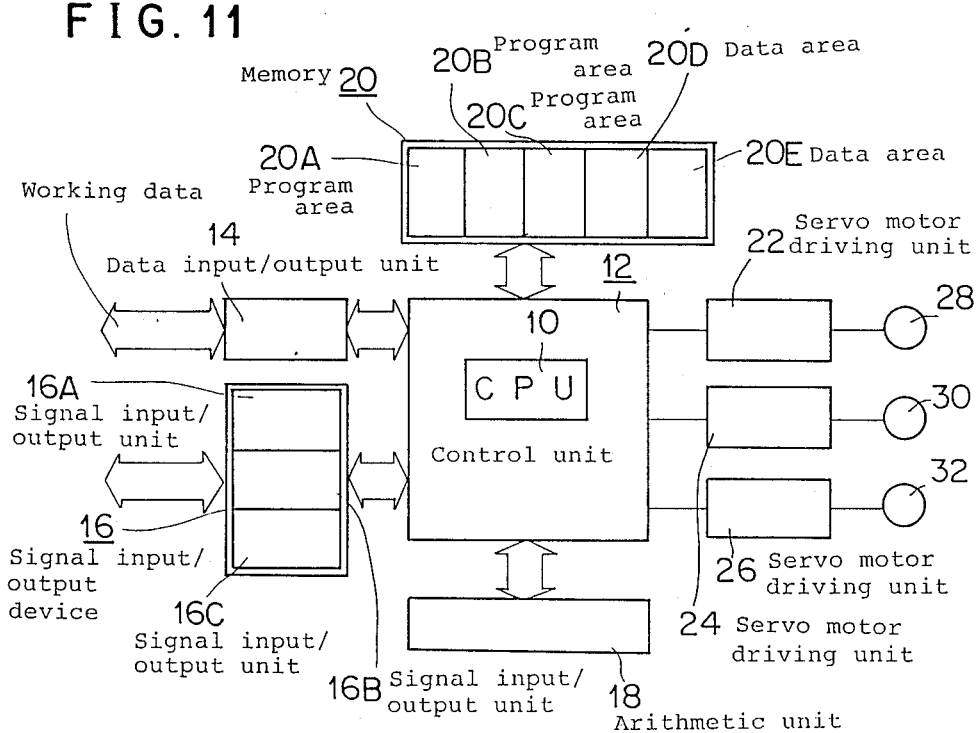
FIG. 11 is a block diagram showing a numerical control according to a third embodiment of this invention.

FIG. 11 shows a third embodiment of a numerical control apparatus according to this invention. In FIG. 11, the same reference numerals as those in FIG. 2 designate the same or equivalent parts which perform the same functions.

A memory 20 is connected to the control unit 12. The memory 20 has program areas 20A, 20B and 20C. The program areas 20A, 20B and 20C respectively store independently operable control programs. Further, the memory 20 has a data area 20D.

in addition, the memory 20 further has a data area 20E. The data area 20E stores name setting means for setting arbitrarily the names of objects to be controlled n the control programs stored in the above-described program areas 20A, 20B and 20C and commonly setting the programs as required by programming.

Then, servo motor driving units 22, 24 and 26 are respectively connected to the control unit 12.

Servo motors 28, 30 and 32 are respectively connected to the driving units 22, 24 and 26. The servo motors 28, 30 and 32 are not always limited to the same machine, and may include two or more machines to be independently operable.

System control means stored in the above-mentioned data area 20D is executed in the control unit 12.

As shown in FIG. 3 similarly to the embodiment 1 described above, the data inputted from the data input/output unit 14 and the signal input/output device 16 are referred to the control programs stored in the program areas 20A to 20C to decide to operate any of these control programs (in steps SA, SB and SC).

Then, the correspondence of the program to be operated to the signal input/output units 16A to 16C for inputting the control data to be used therefor is decided (in step SD). Further, the correspondence of the program to the driving units 22 to 26 to be operated is decided (in step SE).

As described above, the system control means has functions for systemizing the signal input/output units 16A to 16C, the program areas 20A to 20C, and driving units 22 to 26 according to the content of the control operation to be required and grouping the same.

Then, the entire operation of the third embodiment will be described in various cases as examples, similar to the first embodiment.

Referring to FIG. 12, the case that machines 34, 36 and 38 respectively having one shaft are independently controlled will be first described. As in FIG. 4, the signal input/output unit 16A inputs and outputs the control data D34 of the machine 34, the signal input/output unit 16B inputs and outputs the control data D36 of the machine 36, and the signal input/output unit 16C inputs and outputs the control data D38 of the machine 38. The control programs of the machines 34 to 38 are respectively stored in the program areas 20A to 20C, respectively.

In this case, the system control means of the above-mentioned data area 20D systemizes the signal input/output unit 16A, the program area 20A and the driving unit 22, systemizes the signal input/output unit 16B, the program area 20B and the driving unit 24, and also systemizes the signal input/output unit 16C, the program area 20C and the driving unit 26.

The servo motors 28 to 32 are independently controlled according to the control data inputted from the signal input/output units 16A to 16C, and the control programs stored in the program areas 20A to 20C, respectively. In other words, the machines 34 to 38 are independently operated to be started and stopped. The control unit 12 executes a so-called "task control" at this time.

As described above, in this example, the entire numerical control apparatus operates as three independent numerical controls.

When the above-described machines 34, 36 and 38 having one shaft are, for example, all milling machines, it is convenient for the purpose of handling to commonly name the shafts as X rather than naming the shafts as X, Y and Z. Thus, an operator sets the shaft name of the control program as "X" by utilizing the name setting means stored in the program area 20E.

Referring to FIG. 13, the case of the machine 40 having two servo motors and the machine 42 having one servo motor, each being independently controlled, is similar to that described above in FIG. 5.

As described above, in this example, the entire numerical control apparatus operates as numerical controls of two independent systems.

In this example, however, since the machine 40 has two shafts, the shaft names of the machines 40, 42 may be different or common. For example, the shaft names of the machines 40 are set by the name setting means of the program area 20E as "X, Y" and the shaft name of the machine 42 is set as "Z".

Referring to FIG. 14, the other operating mode of this embodiment will be described.

In FIG. 14, the example of the case that the machine 44 has three servo motors is shown, as in FIG. 6. In this case, the signal input/output unit 16B which inputs and outputs the control data D44, the program area 20A for storing the control program, and the driving units 22 to 26 are systemized. In this example, one system equivalent to the numerical control in FIG. 1 is controlled.

It is necessary to name the shafts differently since the names of the control shafts are disposed in the same machine, and the names "X, Y, Z" are, for example, given to the shafts. However, it is possible arbitrarily to put a name on any of the shafts, and to suitably set the name by the name setting means of the program area 20E.

(Embodiment 4)

A fourth embodiment of this invention in which the entire numerical control apparatus constructs a plurality of control processing systems, each system controls an object to be controlled independently by an independent control program, and the driving amounts of pulse generators are independently controlled to be executed, will be described in detail with reference to the accompanying drawings.

Figure 15:
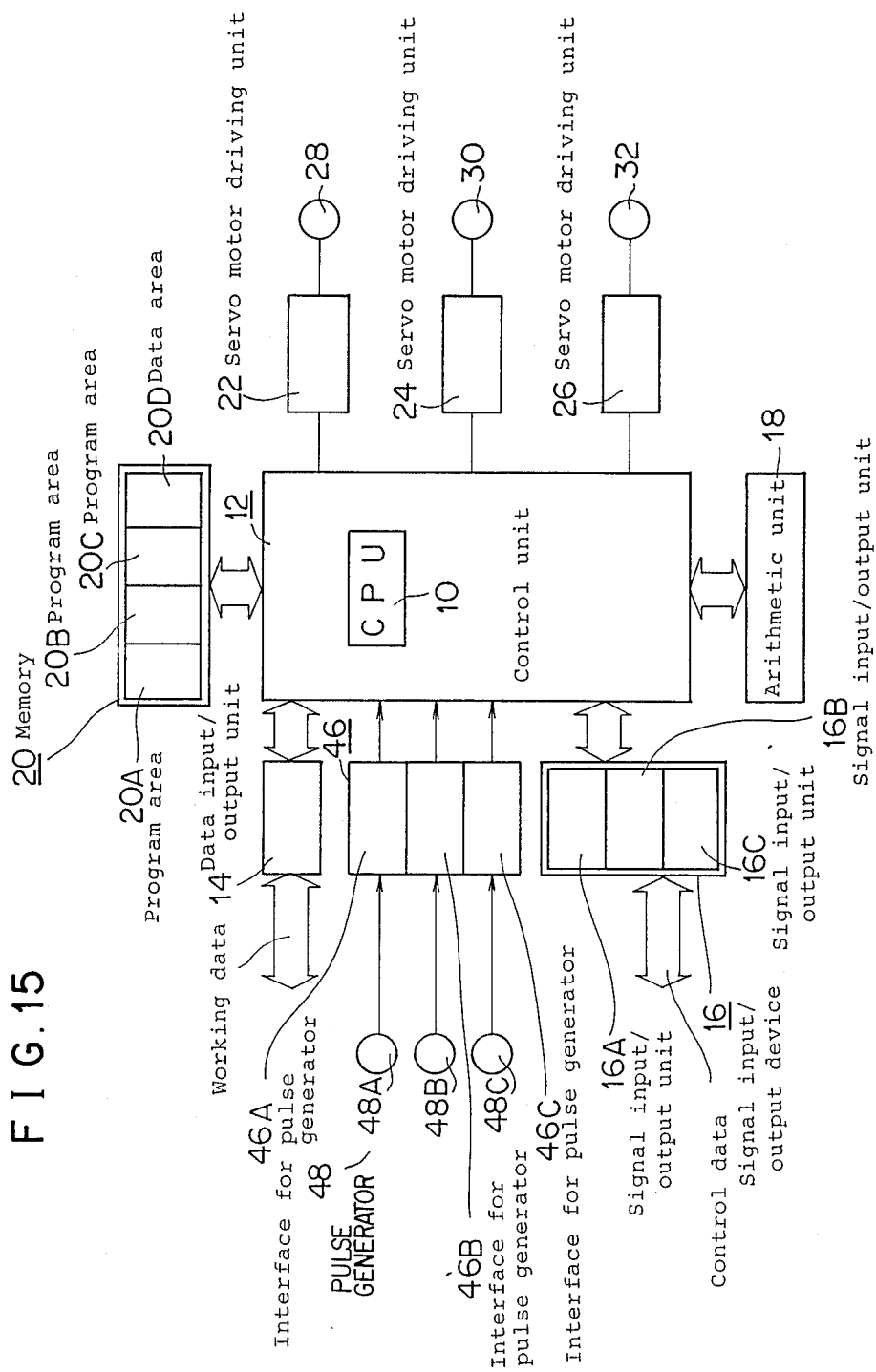
FIG. 15 is a block diagram showing a numerical control according to a fourth embodiment of this invention.

FIG. 15 shows embodiment 4 of a numerical control apparatus according to this invention. In FIG. 15, the same reference numerals as those in FIG. 2 designate the same or equivalent parts which perform the same functions described above.

In this embodiment an interface unit 46 for pulse generators is connected to the control unit 12. The interface unit 46 for the pulse generators has interfaces 46A, 46B and 46C which are connected to and can independently input and output pulses from the pulse generators 48A, 48B and 48C, respectively. More specifically, pulse generators 48A, 48B and 48C perform the functions of individually instructing the driving amounts of objects to be controlled, as required. In other words, the pulse generators generate pulses at a rate responsive to the rotating speeds of the shafts of each of the pulse generators, to thereby control the initialization of the rotating amount of the control shaft. The control of rotating amounts are applied to three shafts X, Y and Z.

An arithmetic unit 18 is connected to the control unit 12 The arithmetic unit 18 computes the above-mentioned interpolation or the like calculation.

A memory 20 is connected to the control unit 12. The memory 20 has program areas 20A, 20B and 20C. The program areas 20A, 20B and 20C respectively store independently operable control programs. In other words, the programs stored in the program areas 20A, 20B and 20C have functions similar to the program stored in the program area 60B in FIG. 1, and can be independently executed.

Further, the memory 20 has a data area 20D. The data area 20D stores working data similarly to the data area 60A in FIG. 1, and additionally stores programmed system control means.

Servo motor driving units 22, 24 and 26 are respectively connected to the control unit 12. The driving units 22, 24 and 26 can independently operate and have similar functions to the driving unit 62 in FIG. 1. However, each driving unit can control one shaft.

Servo motors 28, 30 and 32 are respectively connected to the driving units 22, 24 and 26. The servo motors 28, 30 and 32 are not always limited to the same machine, and may include two or more machines to be independently operable.

System control means stored in the above-mentioned data area 20D will be described. This means is executed in the control unit 12

As shown in FIG. 16, the data inputted from the data input/output unit 14 and the signal input/output device 16 are referred to the control programs stored in the program areas 20A to 20C to decide to operate any of these control programs (in steps SA, SB and SC).

Then, the correspondence of the program to be operated to the signal input/output units 16A to 16C for inputting the control data to be used therefor is decided (n step SD). Then, the correspondence of the operating program to the pulse generators 48A to 48C for generating pulses is decided (in step SE). Further, the correspondence of the program to the driving units 22 to 26 to be operated is decided (in step SF).

As described above, the system control means has functions for systemizing the signal input/output units 16A to 16C, the program areas 20A to 20C, the driving units 22 to 26 and the pulse generators 48A to 48C according to the content of the control operation to be required and grouping the same.

Then, the entire operation of the fourth embodiment is described in various cases as examples corresponding to those shown in FIGS. 4, 5 and 6, respectively.

Figure 17:
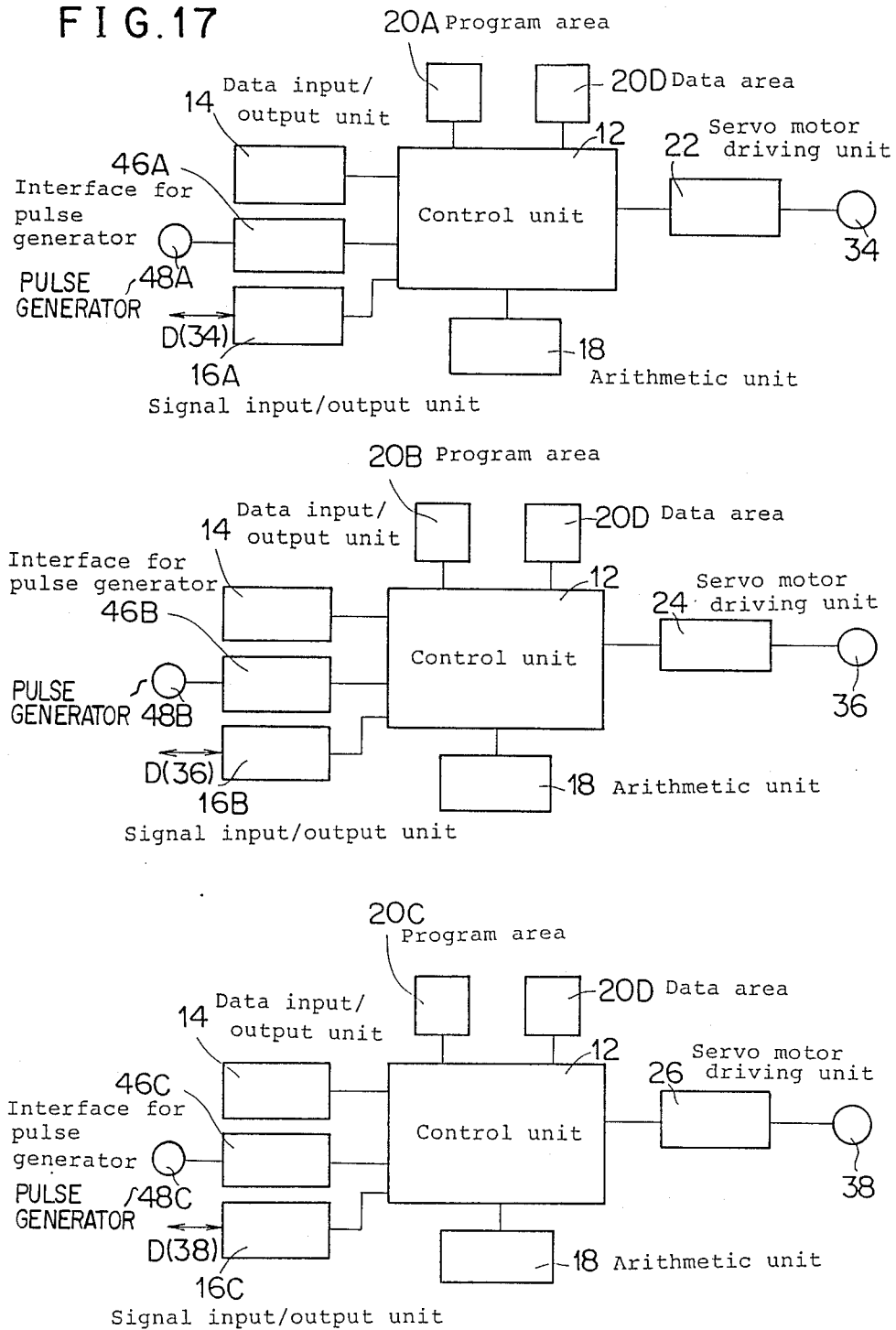

As shown in FIG. 17, the pulse generator 48A generates pulses to the machine 34, the pulse generator 48B generates pulses to the machine 36, and the pulse generator 48C generates pulses to the machine 38.

The control programs of the machines 34 to 38 are stored in the program areas 20A to 20C, respectively.

In this case, the system control means of the above-mentioned data area 20D systemizes the signal input-/output unit 16A, the program area 20A, the pulse generator 48A and the driving unit 22, systemizes the signal input/output unit 16B, the program area 20B, the pulse generator 48B and the driving unit 24, and also systemizes the signal input/output unit 16C, the program area 20C, and the pulse generator 48C and the driving unit 26.

The servo motors 28 to 32 are independently controlled according to the control data inputted from the signal input/output units 16A to 16C, and the control programs stored in the program areas 20A to 20C, respectively. In other words, the machines 34 to 38 are independently operated to be started and stopped, and the entire numerical control apparatus operates as three independent numerical controls.

Then, referring to FIG. 18, the case that the machine 40 having two servo motors and the machine 42 having one servo motor are independently controlled as in FIG. 5 is shown.

The pulse generator 48C generates pulses to the machine 40, and the pulse generator 48A generates pulses to the machine 42.

In this case, as shown in FIG. 18, the system control means of the data area 20D systemizes the signal input-/output unit 16A, the program area 20B, the pulse generator 48C and the driving units 22 and 24, and also systemizes the signal input/output unit 16C, the program area 20C, and the pulse generator 48A and the driving unit 26.

The machine 40 is controlled by the control program stored in the program area 20B, and the machine 42 is controlled by the control program stored in the program area 20C. Since two servo motors are to be controlled to control the machine 40, the arithmetic unit 18 calculates the interpolation.

As described above, in this example, the entire numerical control apparatus operates as the numerical controls of two independent systems.

Figure 19:
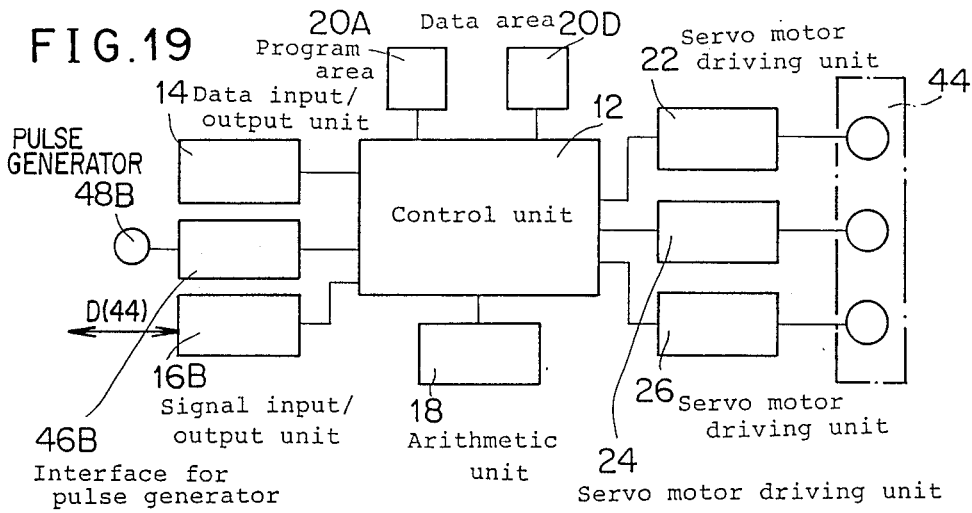

Referring to FIG. 19, the other operating mode of this embodiment corresponding to FIG. 6, wherein the machine 44 has three servo motors, is shown. In this case, the signal input/output unit 16B which inputs and outputs the control data D44, the program area 20A for storing the control program, the pulse generator 48B for generating pulses to the machine 44 and the driving units 22 to 26 are systemized. In this example, one system equivalent to the numerical control in FIG. 1 is controlled.

(Embodiment 5)

A fifth embodiment of this invention in which the entire numerical control apparatus constructs a plurality of control processing systems, each system controls objects to be controlled independently by independent control programs, and independently to be interrupted, will be described in detail with reference to the accompanying drawings.

Figure 20:
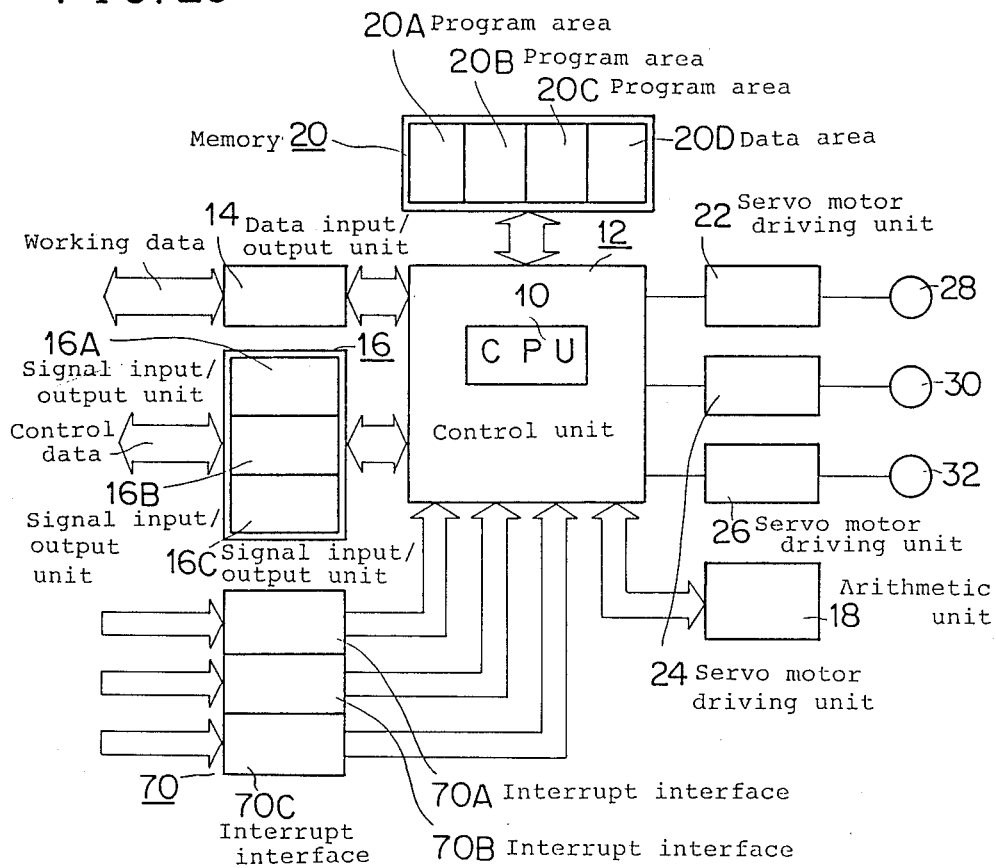
FIG. 20 is a block diagram showing a numerical control according to a fifth embodiment of this invention.

FIG. 20 shows an embodiment 5 of a numerical control apparatus according to this invention. In FIG. 20, the same reference numerals as those in FIG. 2 designate the same or equivalent parts.

In this embodiment, an interrupt input signal interface unit (hereinafter referred to as "an interrupt interface unit") 70 is connected to the control unit 12. The interface unit 70 has interfaces 70A, 70B and 70C which can independently input interrupt commands. More specifically, when any one of the interrupts is instructed through the interrupt interfaces 70A, 70B or 70C, during the predetermined operation being executed, the operation being executed is interrupted by the control unit 12, which controls the driving units to execute the interrupt.

System control means stored in the above-mentioned data area 20D is executed in the control unit 12.

As shown in FIG. 21, the data inputted from the data input/output unit 14 and the signal input/output device 16 are referred to the control programs stored in the program areas 20A to 20C to decide to operate any of these control programs (in steps SA, SB and SC).

Then, the correspondence of the program to be operated to the signal input/output units 16A to 16C for inputting the control data to be used therefor is decided (in step SD). Then, the correspondence of the operating program to the interrupt interfaces 46A to 46C for inputting interrupt commands is decided (in step SE) Further, the correspondence of the program to the driving units 22 to 26 to be operated is decided (in step SF).

As described above, the system control means has functions for systemizing the signal input/output units 16A to 16C, the program areas 20A to 20C, the driving units 22 to 26 and interrupt interfaces 70A to 70C according to the content of the control operation to be required and grouping the same.

Then, the entire operation of the embodiment 5 will be described in various cases as examples, similar to those above.

Referring to FIG. 22, the case that machines 34, 36 and 38 respectively having one shaft are independently controlled as in FIG. 4 will be first described.

The interrupt interface 70A inputs an interrupt command to the machine 34, and the interrupt interface 70B inputs an interrupt command to the machine 36, and the interrupt interface 70C inputs an interrupt command to the machine 38.

In this case, the system control means of the above-mentioned data area 20D systemizes the signal input-/output unit 16A, the program area 20A, the interrupt interface 70A and the driving unit 22, systemizes the signal input/output unit 16B, the program area 20B, the interrupt interface 70B and the driving unit 24, and also systemizes the signal input/output unit 16C, the program area 20C, and the interrupt interface 70C and the driving unit 26.

The interrupt command from the exterior is inputted through the interrupt interfaces 70A to 70C to each system to independently execute the interrupt in each system.

As described above, in this example, the entire numerical control apparatus operates as three independent numerical controls.

Figure 23:
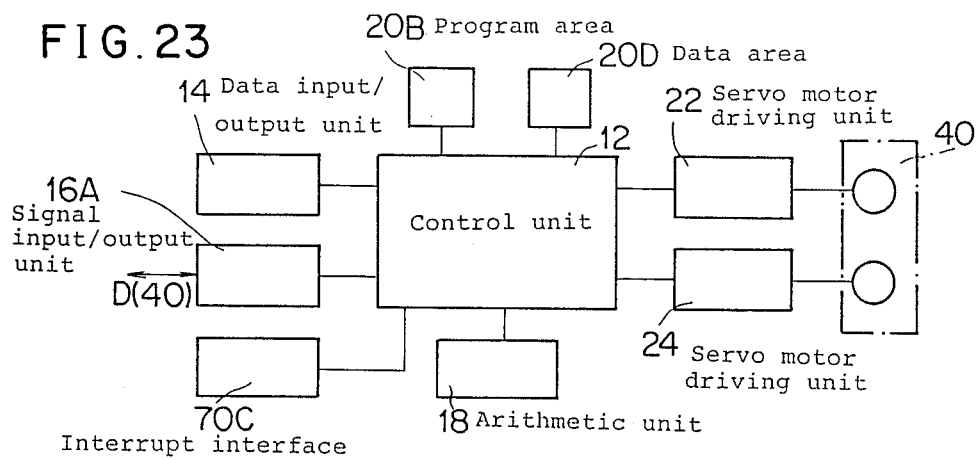

Then, referring to FIG. 23, the case that the machine 40 having two servo motors and the machine 42 having one servo motor are independently controlled as in FIG. 5 is described.

Then the interrupt interface 70C inputs the interrupt command to the machine 40, and the interrupt interface 70A inputs the interrupt command to the machine 42.

In this case, as shown in FIG. 23, the system control means of the data area 20D systemizes the signal input-/output unit 16A, the program are 20B, the interrupt interface 70C and the driving units 22 and 24, and also systemizes the signal input/output unit 16C, the program area 20C, and the interrupt interface 70A and the driving unit 26.

Figure 24:
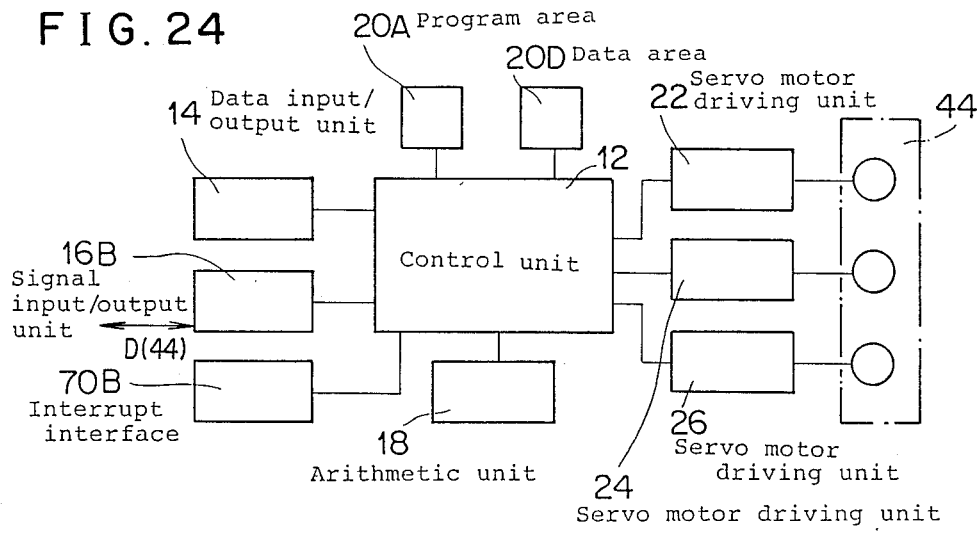

Referring to FIG. 24, the other operating mode of this embodiment similar to FIG. 6 will be described.

In FIG. 24, the example of the case that the machine 44 has three servo motors is shown. In this case, the signal input/output unit 16B which inputs and outputs the control data D44, the program area 20A for storing the control program, the interrupt interface 70B for inputting the interrupt command to the machine 44 and the driving units 22 to 26 are systemized. In this example, one system equivalent to the numerical control in FIG. 1 is controlled.

(Embodiment 6)

A sixth embodiment of this invention in which the entire numerical control apparatus constructs a plurality of control processing systems, and each system controls shafts, spindles or other objects to be controlled independently by independent control programs will be described in detail with reference to the accompanying drawings.

Figure 25:
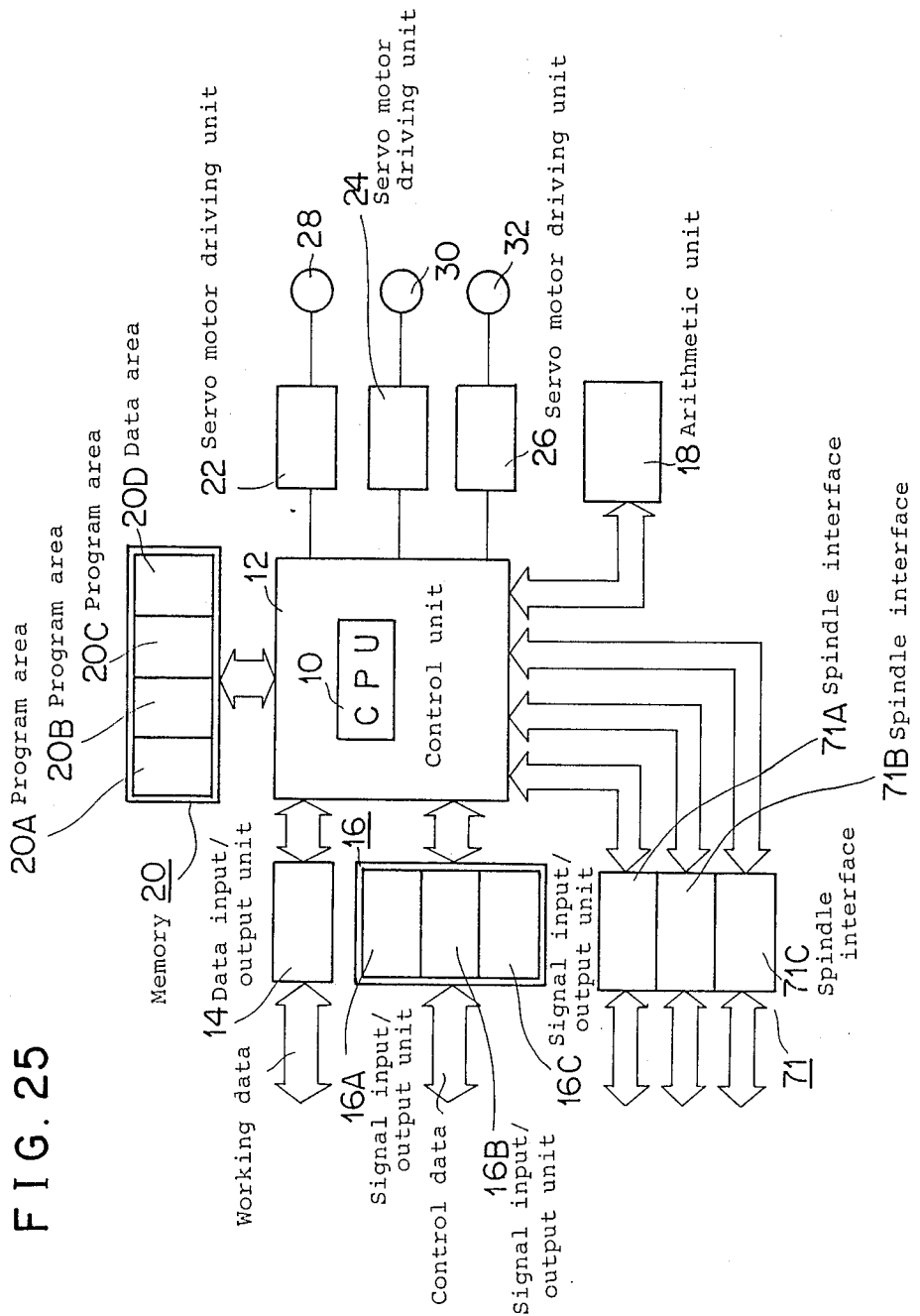
FIG. 25 is a block diagram showing a numerical control according to a sixth embodiment of this invention.

FIG. 25 shows an embodiment 6 of a numerical control apparatus according to this invention. In FIG. 25, the same reference numerals as those in FIG. 2 designate the same or equivalent parts.

A spindle or shaft interface unit 71 is connected to the control unit 12. The spindle interface unit 71 has spindle interfaces 71A, 71B and 71C which can independently input and output spindle control data. More specifically, the spindle interfaces 7A, 7B and 7C respectively input and output independent spindle (not shown) control data to drive the spindle by the spindle drive commands of the outputs to execute a predetermined operation.

An arithmetic unit 18 is connected to the control unit 12. The arithmetic unit Is computes the above-mentioned interpolation or the like calculation.

A memory 20 is connected to the control unit 12. The memory 20 has program areas 20A, 20B and 20C. The program areas 20A, 20B and 20C respectively store independently operable control programs. In other words, the programs stored in the program areas 20A, 20B and 20C have functions similar to the program stored in the program area 60B in FIG. 1, and can be independently executed.

Further, the memory 20 has a data area 20D. The data area 20D stores Working data similarly to the data area 60A in FIG. 1, and additionally stores programmed system control means.

Then, servo motor driving units 22, 24 and 26 are respectively connected to the control unit 12. The driving units 22, 24 and 26 can independently operate and have similar functions to the driving unit 62 in FIG. 1. However, each driving unit can control one shaft.

Servo motors 28, 30 and 32 are respectively connected to the driving units 22, 24 and 26. The servo motors 28, 30 and 32 are not always limited to the same machine, may include two or more machines to be independently operable.

System control means stored in the above-mentioned data area 20D is executed in the control unit 12.

As shown in FIG. 26, the data inputted from the data input/output unit 14 and the signal input/output device 16 are referred to the control programs stored in the program areas 20A to 20C to decide to operate any of these control programs (in steps SA, SB and SC).

Then, the correspondence of the program to be operated to the signal input/output units 16A to 16C for inputting the control data to be used therefor is decided (n step SD). Then, the correspondence of the operating program to the spindle interfaces 71A to 71C for inputting and outputting control data used to control the corresponding spindle is decided (in step SE). Further, the correspondence of the program to the driving units 22 to 26 to be operated is decided (in step SF).

As described above, the system control means has functions for systemizing the signal input/output units 16A to 16C, the program areas 20A to 20C, the driving units 22 to 26 and the spindle interfaces 71A to 71C according to the content of the control operation to be required and grouping the same.

Then, the entire operation of the embodiment 6 will be described in various cases as examples similar to those of Figs. 4 to 6.

Referring to FIG. 27, the case that machines 34, 36 and 38 respectively having one shaft are independently controlled as in FIG. 4 will be first described.

The spindle interface 71A inputs and outputs the spindle control data D34M of the machine 34, and the spindle interface 7B inputs and outputs the spindle control data D36M of the machine 36, and the spindle interface 71C inputs and outputs the spindle control data D38M of the machine 38.

In this case, the system control means of the above-mentioned data area 20D systemizes the signal input-/output unit 16A, the program area 20A, the spindle interface 71A and the driving unit 22, systemizes the signal input/output unit 16B, the program area 20B, the spindle interface 71B and the driving unit 24, and also systemizes the signal input/output unit 16C, the program area 20C, and the spindle interface 71C and the driving unit 26.

The spindles of the machines are independently controlled according to the control programs stored in the program areas 20A to 20C.

In this example, the entire numerical control apparatus operates as three independent numerical controls.

Then, referring to FIG. 28, the case that the machine 40 having two servo motors and the machine 42 having one servo motor are independently controlled as in FIG. 5 will be described.

The spindle interface 71C inputs and outputs the control data D40M for the spindle of the machine 40, and the spindle interface 71A inputs and outputs the control data D42M for the spindle of the machine 42.

In this case, as shown in FIG. 28, the system control means of the data area 20D systemizes the signal input-/output unit 16A, the program area 20B, the spindle interface 71C and the driving units 22 and 24, and also systemizes the signal input/output unit 16C, the program area 20C, and the spindle interface 71A and the driving unit 26.

In this example, the entire numerical control apparatus operates as the numerical controls of two independent systems.

Figure 29:
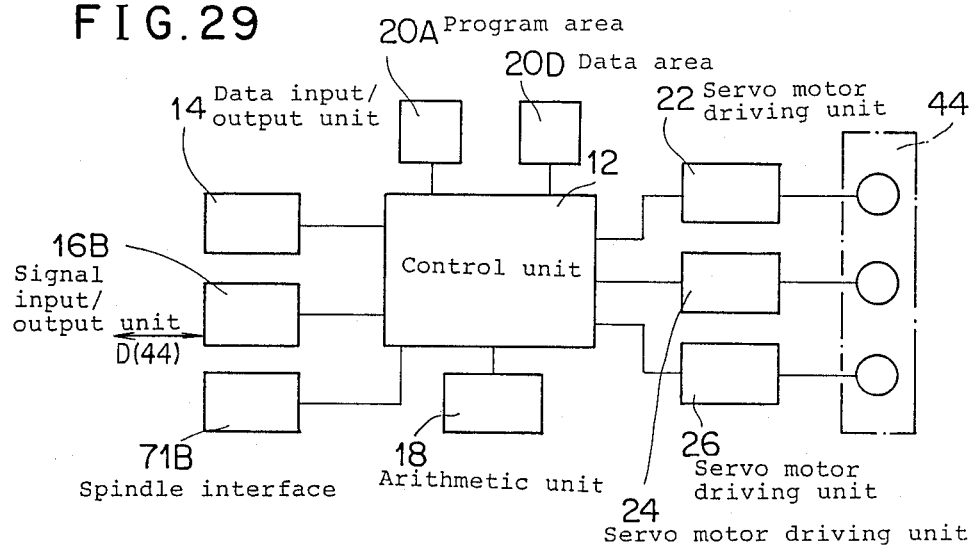
Figure 30:
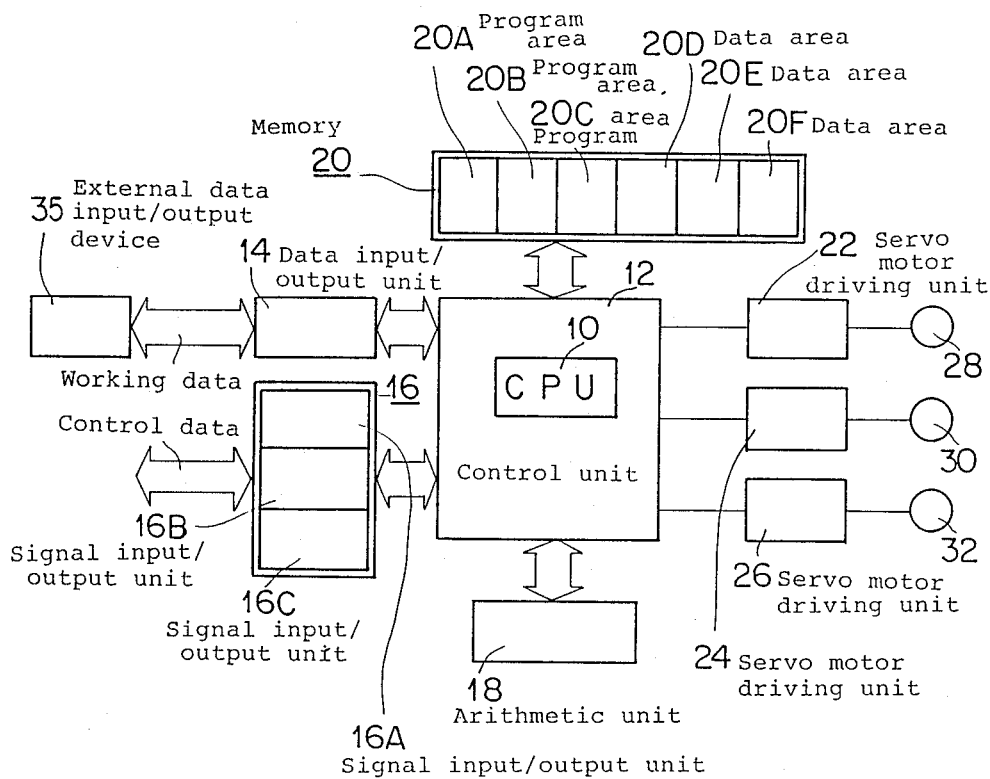
FIG. 30 is a block diagram showing a numerical control according to a seventh embodiment of this invention.
Figure 32:
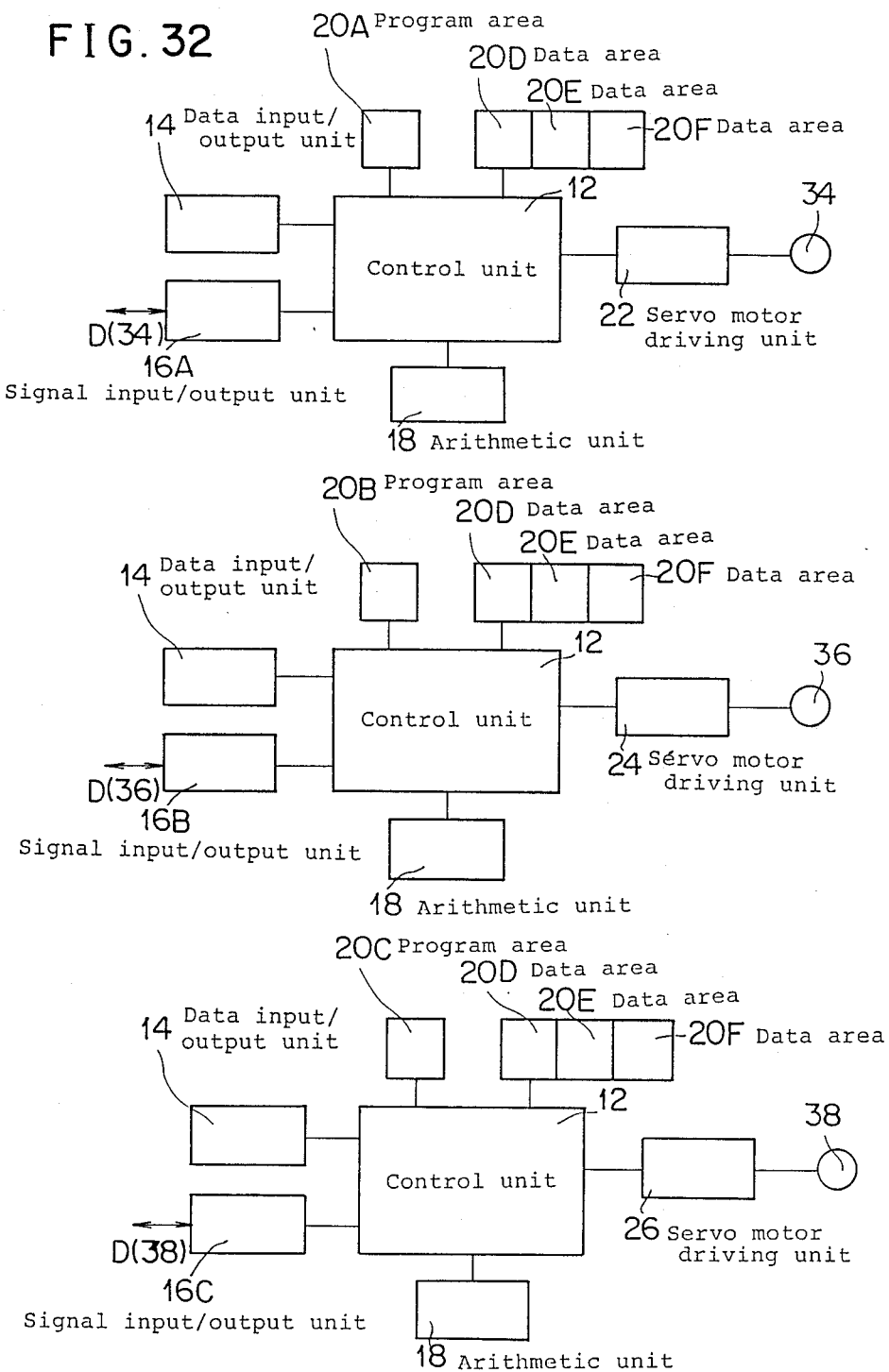
Figure 34:
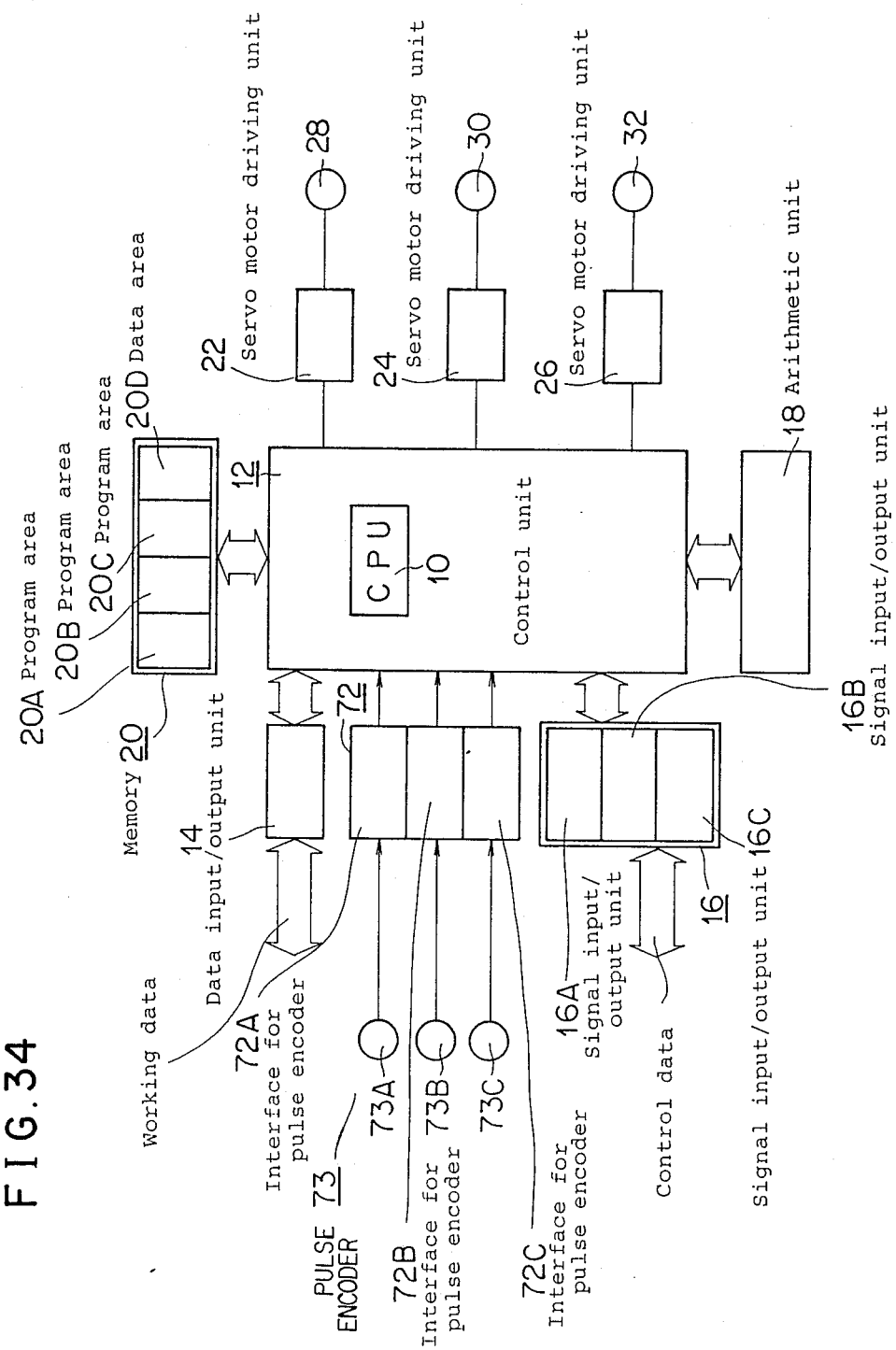
FIG. 34 is a block diagram showing a numerical control according to an eighth embodiment of this invention.

Referring to FIG. 29, the other operating mode of this embodiment similar to FIG. 6 is shown.

In FIG. 29, the example of the case that the machine 44 has three servo motors is shown. In this case, the signal input/output unit 16B which inputs and outputs the control data D44, the program area 20A for storing the control program, the spindle interface 71B for inputting and outputting the control data to the machine 44 and the driving units 22 to 26 are systemized.

(Embodiment 7)

A seventh embodiment of this invention in which the entire numerical control apparatus constructs a plurality of control processing systems, each system is independently controlled by an independent control program, and operates a properly selected working data input unit 14 correspond to the data input/unit 54 in FIG. 1, and inputs working data from an external data input/output unit (not shown), and outputs the working data to the control unit 10.

Then, a signal input/output device 16 is connected to the control unit 12. The signal input/output device 16 has signal input/output units 16A, 16B and 16C which can input independently controlling data and can output the independently controlling data to the control unit 12. In other words, the signal input/output units 16A, 16B and 16C respectively have similar functions as the signal input/output units 56 in FIG. 1.

An interface unit 46 for pulse generators is connected to the control unit 12. The interface unit 46 for the pulse generators has interfaces 46A, 46B and 46C which can independently input and output pulses from the pulse generators, respectively. More specifically, pulse generators 48A, 48B and 48C have functions for manually instructing the driving amounts of objects to be controlled as required. In other words, the pulse generators generate pulses responsive to the rotating speeds of the pulse generators to thereby control the initialization of the rotating amount of the control shaft. The control amounts are applied to three shafts X, Y and Z. The control amounts may be all applied to the shafts. The interfaces 46A, 46B and 46C are respectively connected to the pulse generators 48A, 48B and 48C which can independently generate pulses.

An arithmetic unit 18 is then connected to the control unit 12. The arithmetic unit 18 computes the above-mentioned interpolation or the like calculation.

Subsequently, a memory 20 is connected to the control unit 12. The memory 20 has program areas 20A, 20B and 20C. The program areas 20A, 20B and 20C respectively store independently operable control programs. In other words, the programs stored in the program areas 20A, 20B and 20C have functions similar to the program stored in the program area 60B in FIG. 1, and can be independently executed.

Further, the memory 20 has a data area 20D. The data area 20D stores working data similarly to the data area 60A in FIG. 1, and additionally stores programmed system control means.

Then, servo motor driving units 22, 24 and 26 are respectively connected to the control unit 12. The driving units 22, 24 and 26 can independently operate and have similar functions to the driving unit 62 in FIG. 1. However, each driving unit can control one shaft.

Servo motors 28, 30 and 32 are respectively connected to the driving units 22, 24 and 26. The servo motors 28, 30 and 32 are not always limited to the same machine, may 20A to 20C, and the working programs PA to PF to be executed in the machines 34 to 38 are stored in the program area 20E.

In this case, the system control means of the above-mentioned data area 20D systemizes the signal input-/output unit 16A, the program area 20A and the driving unit 22, systemizes the signal input/output unit 16B, the program area 20B and the driving unit 24, and also systemizes the signal input/output unit 16C, the program area 20C and the driving unit 26.

Any of the working programs PA to PF is selected from the program area 20E, read out by the control unit 12 according to its work number, and designated to be commonly executed in the machines 34, 36, 38 by common designating means of the program area 20F.

The servo motors 28 to 32 are independently controlled according to the control data inputted from the signal input/output units 16A to 16C and any selected program from the working programs PA to PF, the control programs stored in the program areas 20A to 20C, respectively. In other words, the machines 34 to 38 are independently operated to be started and stopped. However, the working contents are the same n the respective machines. The control unit 12 executes a so-called "task control" at this time.

As described above, in this example, the entire numerical control apparatus operates as three independent numerical controls.

Referring to FIG. 33A, the case that the machine 40 having two servo motors and the machine 42 having one servo motor are independently controlled is shown.

In FIG. 33A, assume that the signal input/output unit 16A inputs and outputs the control data D40 for the machine 40, the signal input/output unit 16C inputs and outputs the control data D42 for the machine 42 and that the control program for operating the machine 40 is stored in the program area 20B and the control program for operating the machine 42 is stored in the program area 20C.

The program area 20E stores the working programs PA to PF.

In this case, as shown in FIG. 33A, the system control means of the data area 20D systemizes the signal input-/output unit 16A, the program area 20B and the driving units 22 and 24, and also systemizes the signal input/output unit 16C, the program area 20C and the driving unit 26.

The working program PE of the working programs PA to PF stored in the program area 20E is selected, and commonly designated by common designating means.

The machine 40 is controlled by the control program stored in the program area 20B and the selected working program PE, and the machine 42 is controlled by the control program stored in the program area 20C and the selected working program PE. Since two servo motors are to be controlled to control the machine 40, the arithmetic unit 18 calculates the interpolation.

As described above, in this example, the entire numerical control apparatus operates as the numerical controls of two independent systems.

In this example, different working programs may be executed in the machines 40 and 42 such that the working program PB is executed, for example, in the machine 40, and the working program PD is executed in the machine 42.

Referring to FIG. 33B, the other operating mode of this embodiment is shown.

In FIG. 33B, the example of the case that the machine 44 has three servo motors is shown.

Working programs to be executed are stored in the program area 20E, and any of them may be arbitrarily selected to be executed.

Therefore, the numerical control of this embodiment 7 has such advantages that a plurality of machines can be efficiently numerically controlled, the content of an operation can be variously selected to be commonly executed in each system and can be reduced in cost similarly to the embodiment 1.

(Embodiment 8)

An eighth embodiment of this invention in which the entire numerical control apparatus constructs a plurality of control processing systems, each system controls an object to be controlled independently by independent control program, and synchronously driving control can be independently executed by synchronously feeding pulse encoder means, will be described in detail with reference to the accompanying drawings.

In this embodiment, an interface unit 72 for pulse encoders is connected to the control unit 12. The interface unit 72 for the pulse encoders has interfaces 72A, 72B and 72C which can independently input and output pulses from the pulse encoders, respectively. The pulse encoders 73A, 73B and 73C which can generate independently synchronously feeding pulses are respectively connected to the interfaces 72A, 72B and 72C for the pulse encoders.

The pulse encoders 73A, 73B and 73C are provided, for example, on the spindles of the respective machine tools to synchronously drive objects to be controlled as required. For example, it is necessary to set a pitch in the operation of cutting screw threads to move the tool at any mm per one revolution of the screw. In this case, the tool can be synchronously driven by the synchronously feeding pulse encoders 73.

System control means stored in the above-mentioned data area 20D is executed in the control unit 12.

Figure 35:
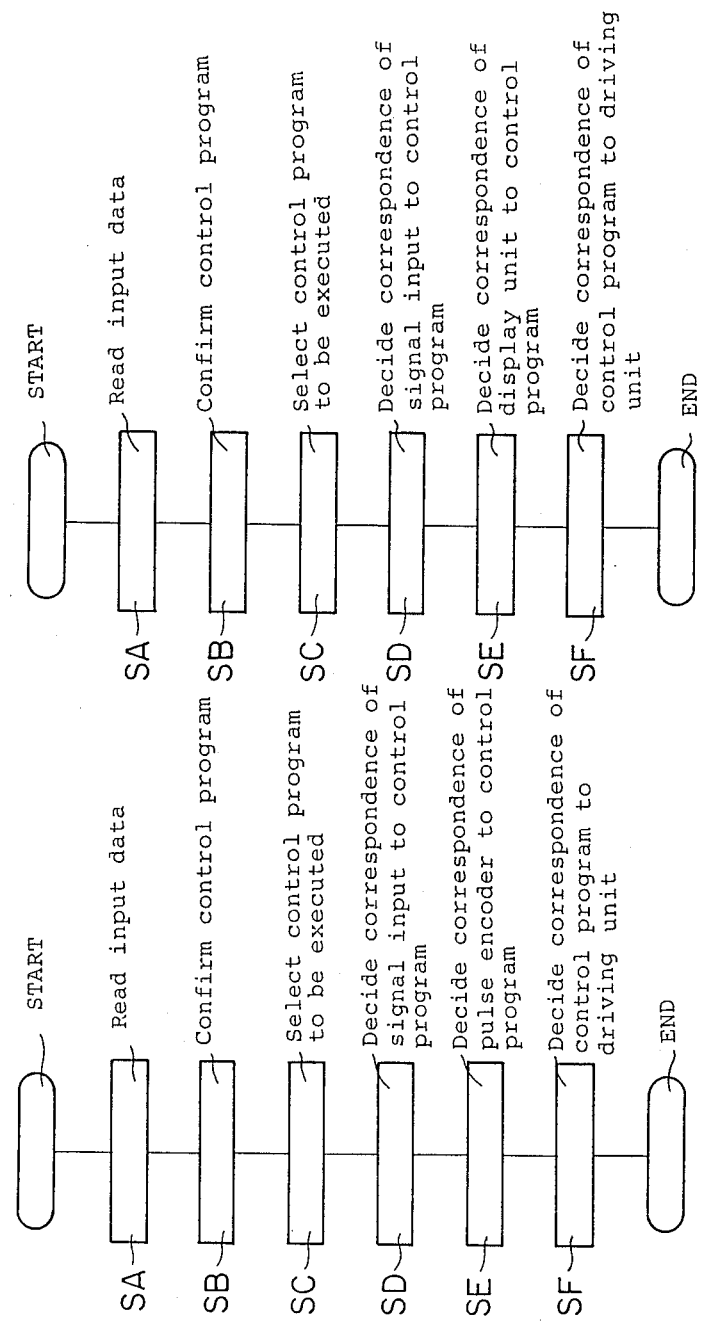
FIG. 35 is an explanatory view for describing the function of system control means according to the eighth embodiment.

As shown in FIG. 35, the data inputted from the data input/output unit 14 and the signal input/output device 16 are referred to the control programs stored in the program areas 20A to 20C to decide to operate any of these control programs (in steps SA, SB and SC).

Then, the correspondence of the program to be operated to the signal input/output units 16A to 16C for inputting the control data to be used therefor is decided (in step SD). Then, the correspondence of the operating program to the pulse encoders 73A to 73C for generating pulses is decided (in step SE). Further, the correspondence of the program to the driving units 22 to 26 to be operated is decided (in step SF).

As described above, the system control means has functions for systemizing the signal input/output units 16A to 16C, the program areas 20A to 20C, the driving units 22 to 26 and the pulse encoders 73A to 73C according to the content of the control operation to be required and grouping the same.

Then, the entire operation of the embodiment s will be described in various cases as examples.

Referring to FIG. 36, the case that machines 34, 36 and 38 respectively having one shaft are independently controlled is shown.

The pulse encoder 73A generates pulses for synchronously feeding to the machine 34, the pulse encoder 73B generates pulses for synchronously feeding to the machine 36, and the pulse encoder 73C generates pulses for synchronously feeding to the machine 38.

In this case, the system control means of the above-mentioned data area 20D systemizes the signal input/output unit 16A, the program area 20A, the pulse encoder 73A and the driving unit 22, systemizes the signal input/output unit 16B, the program area 20B, the pulse encoder 73B and the driving unit 24, and also systemizes the signal input/output unit 16C, the program area 20C, and the pulse encoder 73C and the driving unit 26.

The pulses generated from the pulse encoders 73A to 73C are inputted through the interfaces 7? A and 72C for the pulse encoders to the control unit 12, which independently controls to drive the driving unit 22 to 26 to synchronously feed in each system.

More specifically, the control unit 12 calculates the above-mentioned interpolation by the arithmetic unit 18 from the data stored in the data area 20D according to the programs and the data stored in the program areas 20A to 20C to instruct the system to drive the independent driving units 22, 24 and 26.

When the pulses from the independent pulse encoders 73A to 73C are inputted through the interfaces 72A to 72C for the pulse encoders to the control unit 12 at this time, the control unit 12 controls to drive synchronously the control shafts to be controlled.

Thus, the independent servo motors 34, 36, 38 are driven to execute a predetermined operation according to the input data.

As described above, in this example, the entire numerical control apparatus operates as three independent numerical controls.

Figure 37A:
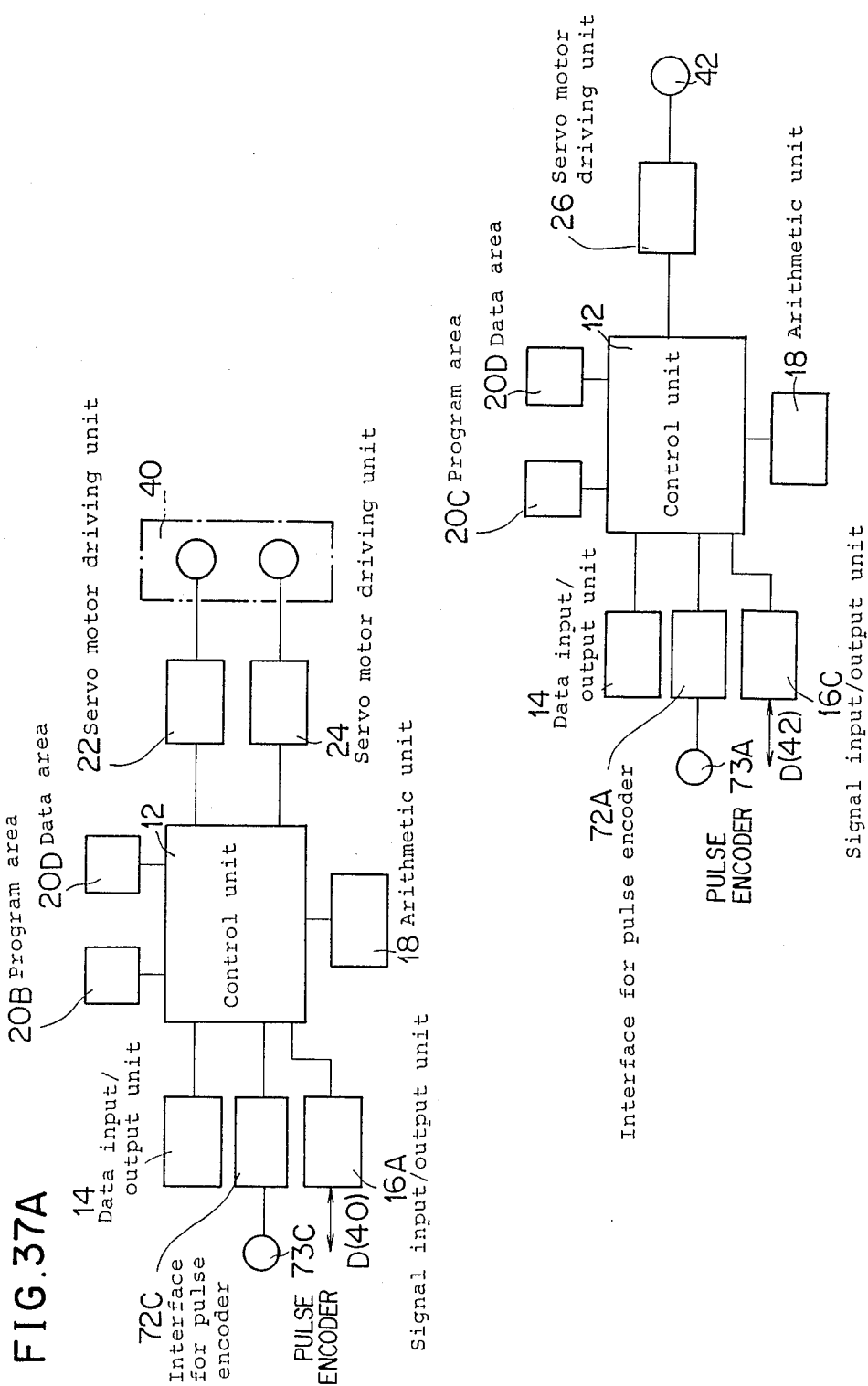

Then, referring to FIG. 37A, the case that the machine 40 having two servo motors and the machine 42 having one servo motor are independently controlled is shown.

The pulse encoder 73C generates pulses to the machine 40, and the pulse encoder 73A generates pulses to the machine 42.

Figure 37B:
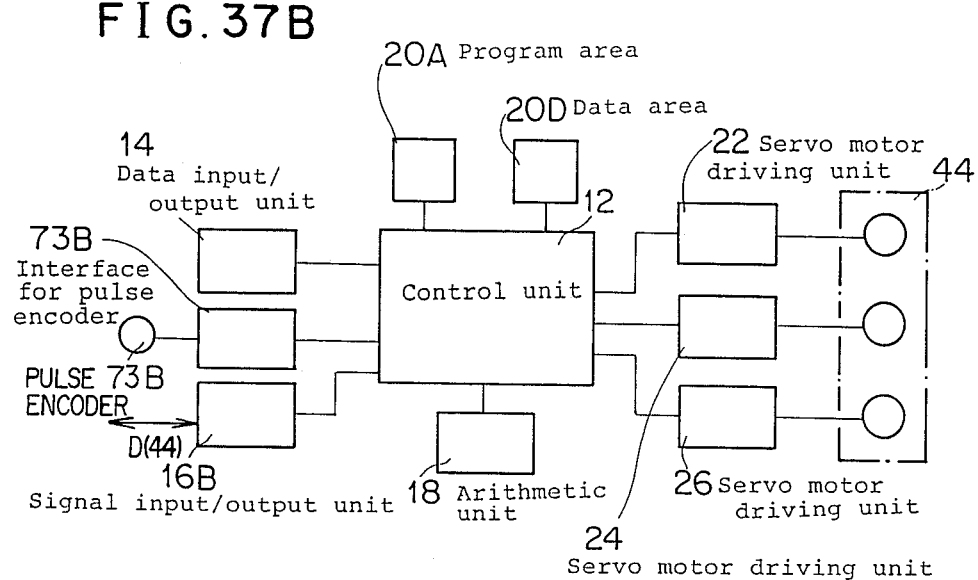

In this case, as shown in FIG. 37B, the system control means of the data area 20D systemizes the signal input/output unit 16A, the program area 20B, the pulse encoder 73C and the driving units 22 and 24, and also systemizes the signal input/output unit 16C, the program area 20C, and the pulse encoder 73A and the driving unit 26.

Referring to FIG. 37B, the other operating mode of this embodiment of the case that the machine 44 has three servo motors is shown. In this case, the signal input/output unit 16B which inputs and outputs the control data D44, the program area 20A for storing the control program, the pulse encoder 73B for generating pulses to the machine 44 and the driving units 22 to 26 are systemized. In this example, one system equivalent to the numerical control in FIG. 1 is controlled.

(Embodiment 9)

A ninth embodiment of this invention in which the entire numerical control apparatus constructs a plurality of control processing systems, each system controls objects to be controlled independently by independent control programs, and independently to be displayed, will be described in detail with reference to the accompanying drawings.

Figure 38:
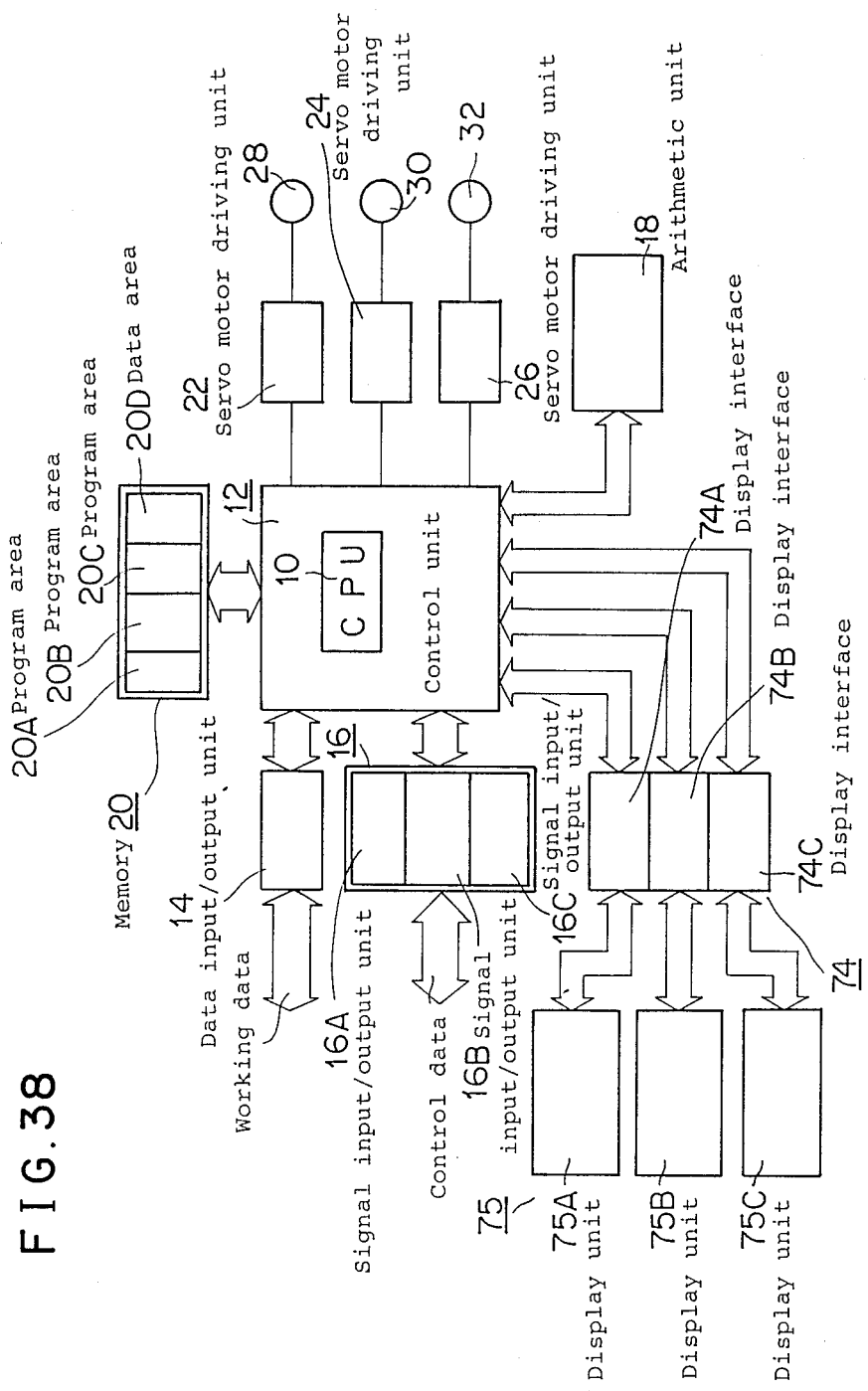
FIG. 38 is a block diagram showing a numerical control according to a ninth embodiment of this invention.

FIG. 38 shows an embodiment 9 of a numerical control apparatus according to this invention. In FIG. 38, the same reference numerals as those in FIG. 2 designate the same or equivalent parts.

A display interface unit 74 is connected to the control unit 12. The display interface unit 74 has display interfaces 74A, 74B and 74C which can independently input and output independent display data. Display units 75A to 75C respectively display the present positions of objects to be controlled, results or alarms, of trouble diagnosis as required. The display units have input units such as keyboards as required to input programs and/or data. The display units 75A, 75B and 75C which can process to display independently are respectively connected to the display interfaces 74A, 74B and 74C.

System control means stored in the above-mentioned data area 20D is executed in the control unit 12.

As shown in FIG. 39, the data inputted from the data input/output unit 14 and the signal input/output device 16 are referred to the control programs stored in the program areas 20A to 20C to decide to operate any of these control programs (in steps SA, SB and SC).

Then, the correspondence of the program to be operated to the signal input/output units 16A to 16C for inputting the control data to be used therefor is decided (in step SD). Then, the correspondence of the operating program to the display units 75A to 75C for displaying is decided (in step SE). Further, the correspondence of the program to the driving units 22 to 26 to be operated is decided (in step SF).

As described above, the system control means has functions for systemizing the signal input/output units 16A to 16C, the program areas 20A to 20C, the driving units 22 to 26 and display units 75A to 75C according to the content of the control operation to be required and grouping the same.

Then, the entire operation of the embodiment 9 will be described in various cases as examples.

Referring to FIG. 40, the case that machines 34, 36 and 38 respectively having one shaft are independently controlled will be first described.

The display unit 75 displays information relating to the machine 34, and the display unit 75B displays information relating to the machine 36, and the display unit 75C displays information relating to the machine 38.

The control programs of the machines 34 to 38 are stored in the program areas 20A to 20C, respectively.

In this case, the system control means of the above-mentioned data area 20D systemizes the signal input/output unit 16A, the program area 20A, the display unit 75A and the driving unit 22, systemizes the signal input/output unit 16B, the program area 20B, the display unit 75B and the driving unit 24, and also systemizes the signal input/output unit 16C, the program area 20C, and the display unit 75C and the driving unit 26.

The data necessary for displaying are inputted through the display interfaces 74A to 74C to the display units 75A to 75C during the operation to be executed in machine tools or during preparing, and independently displayed in each system.

As described above, in this example, the entire numerical control apparatus operates as three independent numerical controls.

Figure 41:
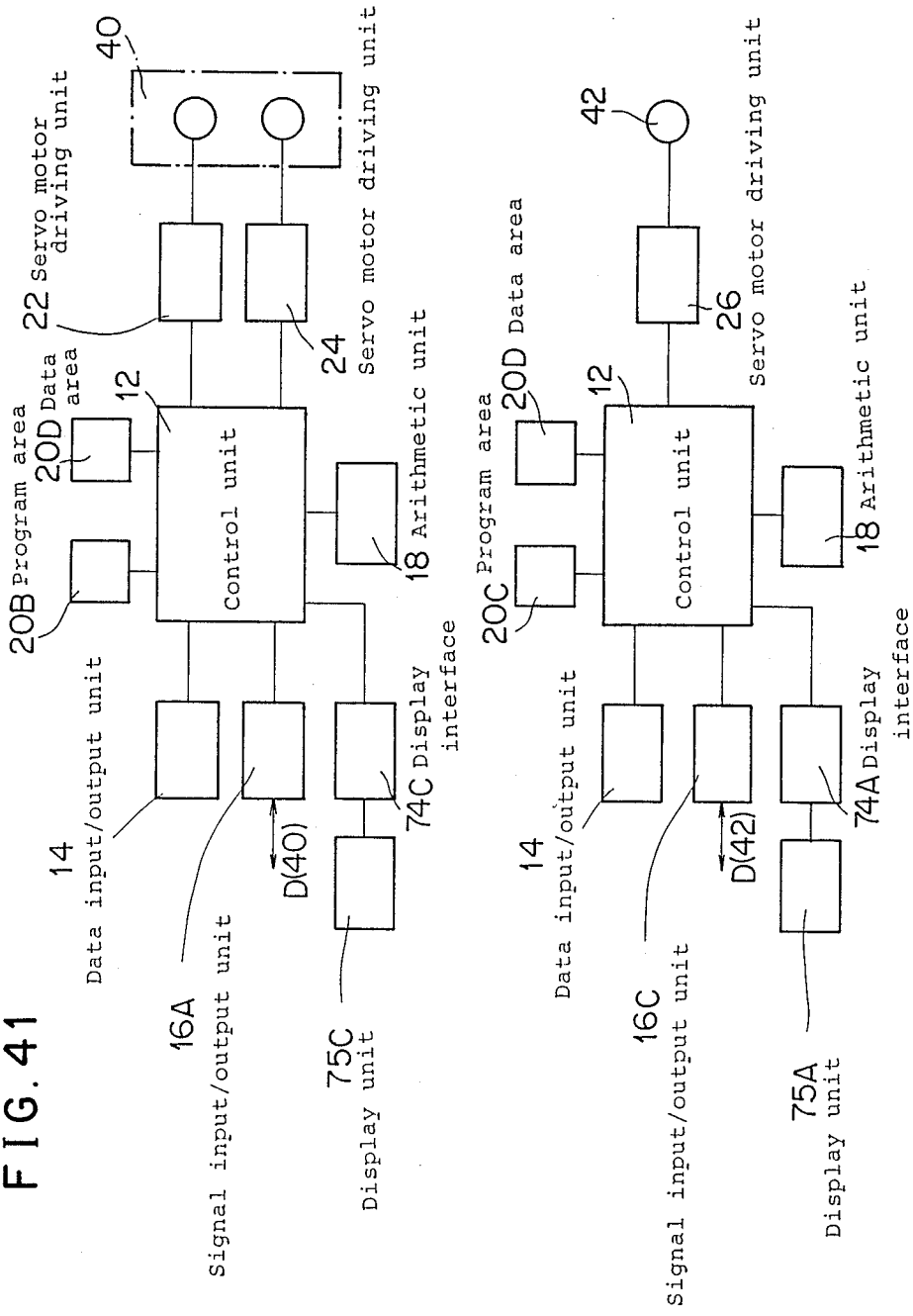

Then, referring to FIG. 41, the case that the machine 40 having two servo motors and the machine 42 having one servo motor are independently controlled is shown.

In FIG. 41, assume that the signal input/output unit 16A inputs and outputs the control data D40 for the machine 40, the signal input/output unit 16C inputs and outputs the control data D42 for the machine 42.

The display unit 75C displays information for the machine 40, and the display unit 75A displays information for the machine 42.

In this case, as shown in FIG. 41, the system control means of the data area 20D systemizes the signal input/output unit 16A, the program area 20B, the display unit 75C and the driving units 22 and 24, and also systemizes the signal input/output unit 16C, the program area 20C, and the display unit 75A and the driving unit 26.

Figure 42:
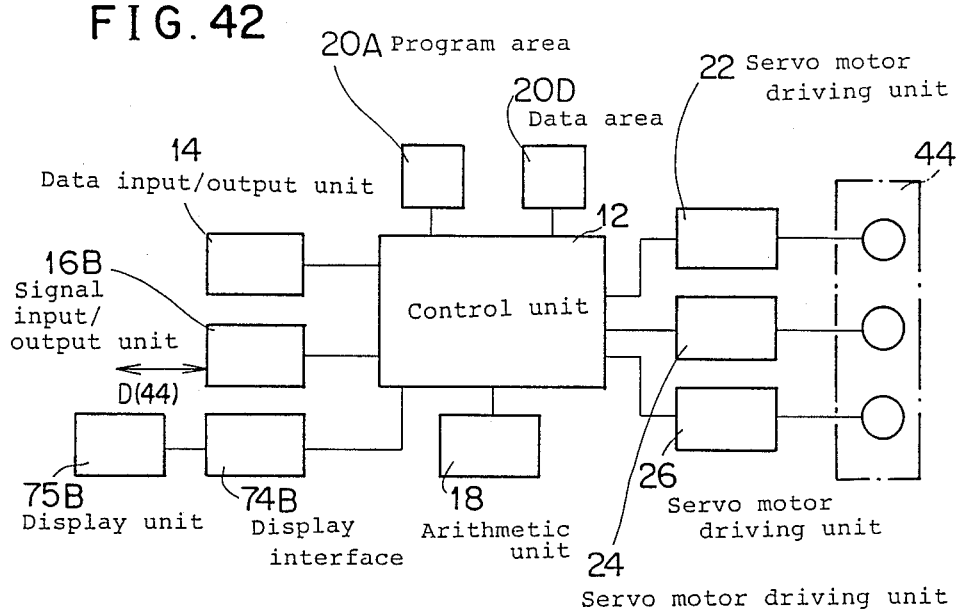

Referring to FIG. 42, the other operating mode of this embodiment, the example of the case that the machine 44 has three servo motors is shown. In this case, the signal input/output unit 16B which inputs and outputs the control data D44, the program area 20A for storing the control program, the display unit 75B for displaying to the machine 44 and the driving units 22 to 26 are systemized. In this example, one system equivalent to the numerical control in FIG. 1 is controlled.

(Embodiment 10)

A tenth embodiment of this invention in which the entire numerical control apparatus constructs a plurality of control processing systems, each system independently controls by independent control programs and information input/output units have a plurality of systems which can input and output information independently and a common unit for inputting and outputting information common to the systems, will be described in detail with reference to the accompanying drawings.

Figure 43:
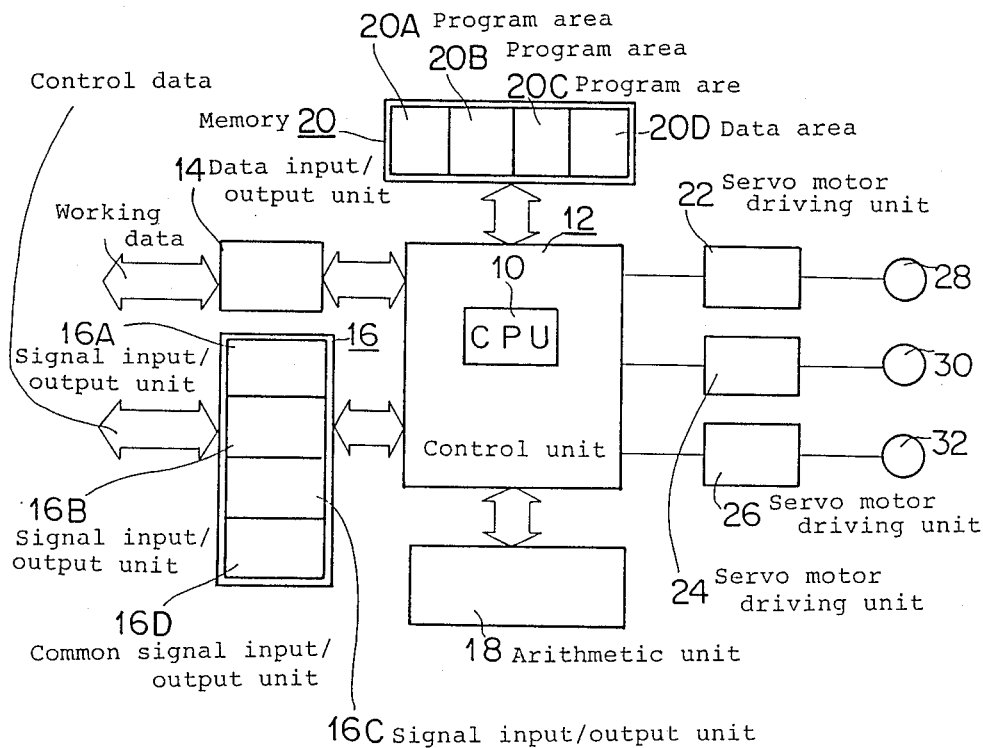
FIG. 43 is a block diagram showing a numerical control according to a tenth embodiment of this invention.

FIG. 43 shows an embodiment 10 of a numerical control apparatus according to this invention Wherein the same reference numerals as those in FIG. 2 designate the same or equivalent parts.

Signal input/output device 16 is connected to the control unit 12. The signal input/output device 16 has signal input/output units 16A, 16B and 16C which can input independently controlling data and can output the independently controlling data to the control unit 12, and further includes a common signal input/output unit 16D Which can commonly input and output signals. In other words, the signal input/output units 16A, 16B and 16C respectively input and output independent signals. On the other hand, the data inputted to or outputted from the common signal input/output unit 16D are commonly used for the independently inputted and outputted data.

System control means stored in the above-mentioned data area 20D is executed in the control unit 12.

As shown in the embodiment 1 in FIG. 3, the data inputted from the data input/output unit 14 and the signal input/output device 16 are referred to the control programs stored is the program areas 20A to 20C to decide to operate any of these control programs (in steps SA, SB and SC). Then, the correspondence of the program to be operated to the signal input/output units 16A to 16C for inputting the control data to be used therefor is decided (in step SD). Further, the correspondence of the program to the driving units 22 to 26 to be operated is decided (in step SE).

As described above, the system control means performs the function of systemizing the signal input/output units 16A to 16C the program areas 20A to 20C, and driving units 22 to 26 according to the content of the control operation to be required and grouping the same.

The common input/output unit 16D inputs and outputs data common to the groups.

Then, the entire operation of the embodiment 10 will be described in various cases as examples.

Referring to FIG. 44, the case that machines 34, 36 and 38 respectively having one shaft are independently controlled will be first described. Assume that the signal input/output unit 16A inputs and outputs the control data D34 of the machine 34, the signal input/output unit 16B inputs and outputs the control data D36 of the machine 36 and the signal input/output unit 16C inputs and outputs the control data D38 of the machine 38. Assume that the common input/output unit 16D inputs and outputs control data common to the machines 34 to 38. The control programs of the machines 34 to 38 are stored in the program areas 20A to 20C, respectively.

In this case, the system control means of the above-mentioned data area 20D systemizes the signal input-/output unit 16A, the program are 20A and the driving unit 22, systemizes the signal input/output unit 16B, the program area 20B and the driving unit 24, and also systemizes the signal input/output unit 16C, the program area 20C and the driving unit 26.

The common input/output unit 16D inputs, for example, control data such as simultaneous start or simultaneous stop.

Then, referring to FIG. 45, the case that the machine 40 having two servo motors and the machine 42 having one servo motor are independently controlled is shown.

In FIG. 45, the signal input/output unit 16A inputs and outputs the control data D40 for the machine 40, the signal input/output unit 16C inputs and outputs the control data D42 for the machine 42, and the common input/output unit 16D inputs and outputs control data common to the machines 40 and 42.

Figure 46:
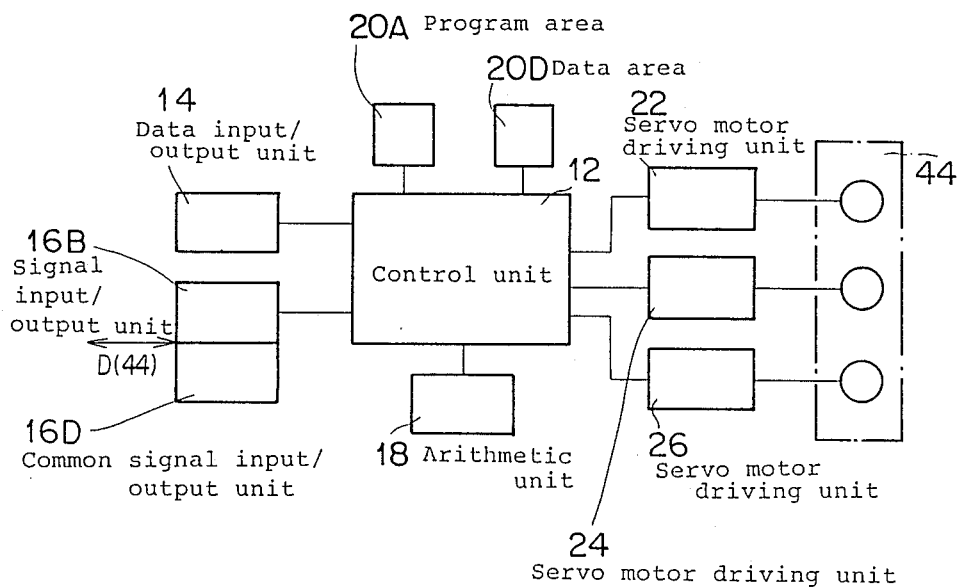

Referring to FIG. 46, the other operating mode of this embodiment will be described.

In FIG. 46, the example of the case that the machine 44 has three servo motors is shown. In this example, one system equivalent to the numerical control in FIG. 1 is controlled. Since the common input/output unit 16D is only one system, the control data may be, though not particularly necessary, inputted or outputted by utilizing this unit.

According to the embodiment 10 of this invention as described above, various independent control systems can be constructed by the system control means. Therefore, the numerical control of this embodiment 10 has such advantages that a plurality of machines can be efficiently numerically controlled and can be reduced in its cost.

Since common control data of the data of the systems are inputted and outputted by common input/output means, the data input/output can be simplified.

INDUSTRIAL APPLICABILITY

According to this invention as described above, various independent control systems can be constructed by system control means. Therefore, this invention provides such advantages that a plurality of machines can be efficiently numerically controlled and its cost can be reduced.

This invention is not limited to the particular embodiments described above, and may include any one of or any combination of a plurality of those embodiments, since they are not mutually exclusive.

What is claimed is:

1. A numerical control apparatus for controlling a plurality of independently operable systems comprising:
    a control unit including a central processing unit, an arithmetic unit, and a memory having a plurality of program areas and at least one data area;
    an information input/output unit having a plurality of means for inputting and outputting working data and control data to and from said control unit;
    a driving unit having a plurality of means for independently driving an object to be controlled; and
    said memory having a plurality of control programs capable of being independently executable, said control unit including system control means responsive to said control programs for systemizing groups of systems of said information input/output unit and systems of said driving unit in accordance with instructions of any of a plurality of instructions of said control programs in said memory program areas;
    such that said apparatus operates to control, simultaneously and independently, each said group of systems systemized by said system control means.

2. The numerical control apparatus as claimed in claim 1, wherein said arithmetic unit comprises means for calculating an interpolation between objects to be controlled within each group.

3. The numerical control apparatus as claimed in claim 1, wherein said memory has sequence control means in addition to a plurality of independently executable control programs, said system control means includes means for arbitrarily grouping systems of said information input/output unit and said driving unit together with said sequence control means corresponding to any of the plurality of control programs, and
    said control unit independently controls every grouped system.

4. The numerical control apparatus as claimed in claim 1, wherein said memory has a plurality of independently executable control programs, said system control means includes means for arbitrarily grouping systems of said information input/output unit and said driving unit corresponding to any of the plurality of control groups and further includes name setting means for arbitrarily setting the name of objects to be controlled in said control program, and
    said control unit independently controls every grouped system.

5. The numerical control apparatus as claimed in claim 1, wherein said numerical control apparatus further includes means for controlling said driving unit systems to drive objects to be controlled according to pulses from a pulse generator means,
    said pulse generator means generates a plurality of independently generated pulses,
    said memory has a plurality of independently executable control programs, said system control means includes means for arbitrarily grouping systems of said information input/output unit, said driving unit and the pulse generator means corresponding to any of the plurality of control groups, and
    said control unit independently controls every grouped system.

6. The numerical control apparatus as claimed in claim 1, further including an interrupt input unit, and wherein said numerical control apparatus includes means for executing an interrupting operation when an interrupt command is inputted from said interrupt input unit,
    said interrupt input unit has a plurality of independently operating interrupt command inputting systems,
    said memory has a plurality of independently executable control programs, said system control means includes means for arbitrarily grouping systems of said information input/output unit, said driving unit and the interrupt input unit corresponding to any of the plurality of control groups, and
    said control unit independently controls every grouped system.

7. The numerical control apparatus as claimed in claim 1, wherein said numerical control apparatus includes means to execute a control command necessary for objects to be controlled including a spindle, said memory has a plurality of independently executable control programs capable of independently controlling the spindle, said system control means includes means for arbitrarily grouping systems of said information input/output unit and said driving unit corresponding to any of the plurality of control groups, and said control unit independently controls every grouped system.

8. The numerical control apparatus as claimed in claim 1, wherein said numerical control apparatus includes means to execute a control command necessary for the driving unit of an object to be controlled according to a control program and a working program, said memory has a plurality of independently executable control programs, at least one working program arbitrarily executable by being selected according to a predetermined work number, said system control means includes means for arbitrarily grouping systems of said information input/output unit and said driving unit corresponding to any of the plurality of control groups, and said control unit independently controls every grouped system.

9. The numerical control apparatus as claimed in claim 8, wherein said memory has common designating means for designating the selected working program to be commonly executed in each group.

10. The numerical control apparatus as claimed in claim 1, further including pulse encoder interface means and wherein said numerical control apparatus includes means to execute a control command for an object to be controlled and controls said driving unit to synchronously drive the object to be controlled by synchronization pulses fed from a pulse encoder means, said synchronization feeding pulse encoder means has a plurality of means for generating pulses for independently synchronously controlling said driving unit to drive, said memory has a plurality of independently executable control programs, said system control means includes means for arbitrarily grouping systems of said information input/output unit, said driving unit and said synchronization pulse feeding pulse encoder means corresponding to any of the plurality of control groups, and said control unit independently controls every grouped system.

11. The numerical control apparatus as claimed in claim 1, further including interface means for a display unit and wherein said numerical control apparatus includes means to execute operations for display of information on said display unit, said display unit has a plurality of means for independently displaying information concerning objects to be controlled, said memory has a plurality of independently executable control programs, said system control means includes means for arbitrarily grouping systems of said information input/output unit, said driving unit and said display unit interface means corresponding to any of the plurality of control groups, and said control unit independently controls and displays information concerning every grouped system.

12. The numerical control apparatus as claimed in claim 11, wherein said display unit displays the present position, diagnosing result and an alarm of an object to be controlled.

13. The numerical control apparatus as claimed in claim 1, wherein said information input/output unit includes a plurality of means for independently inputting and outputting information, and a common signal input/output unit for inputting and outputting information common to all the systems, and said control unit independently controls such information for every grouped system.

14. The numerical control apparatus as claimed in any of claims 3 to 13, wherein said arithmetic unit comprises means for calculating an interpolation, as necessary, between objects to be controlled within each group.

* * * * *